US007287373B2

(12) United States Patent
Matsuda

(10) Patent No.: US 7,287,373 B2
(45) Date of Patent: Oct. 30, 2007

(54) EXHAUST PIPE COLLECTING STRUCTURE OF MULTIPLE CYLINDER ENGINE AND PERSONAL WATERCRAFT

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 88 days.

(21) Appl. No.: 10/622,315

(22) Filed: Jul. 18, 2003

(65) Prior Publication Data

US 2004/0050039 A1 Mar. 18, 2004

(30) Foreign Application Priority Data

Jul. 19, 2002 (JP) ............................ 2002-210699

(51) Int. Cl.
*F01N 3/02* (2006.01)

(52) U.S. Cl. ............................ 60/321; 60/320; 60/323

(58) Field of Classification Search .................. 60/323, 60/322, 324, 310, 320, 321
See application file for complete search history.

(56) References Cited

U.S. PATENT DOCUMENTS 5,109,668 A * 5/1992 Lindstedt ..................... 60/310
5,787,709 A * 8/1998 Watanabe et al. ............. 60/313
5,816,045 A * 10/1998 Blocker et al. ............... 60/323
6,027,384 A 2/2000 Nitta et al.
6,122,911 A * 9/2000 Maeda et al. ................. 60/323
6,199,376 B1 * 3/2001 Maeda ........................ 60/323
6,454,622 B2 * 9/2002 Mashiko et al. .......... 440/89 R
6,725,655 B2 * 4/2004 Yoshirawa et al. ........... 60/323
6,837,044 B2 * 1/2005 Kobayashi et al. ........... 60/323
6,892,532 B2 * 5/2005 Bruce et al. .................. 60/323
6,959,543 B2 * 11/2005 Havemann et al. ........... 60/323

* cited by examiner

*Primary Examiner*—Tu M. Nguyen
(74) *Attorney, Agent, or Firm*—Alleman Hall McCoy Russell & Tuttle LLP

(57) ABSTRACT

An exhaust pipe collecting structure for a multi-cylinder engine unit having multiple cylinders including a first exhaust pipe group and a second exhaust pipe group, each of which has two exhaust pipes selected from four exhaust pipes respectively connected to the four cylinders; a first exhaust sub-collecting pipe cast integrally with the first exhaust pipe group, a second exhaust sub-collecting pipe cast integrally with the second exhaust pipe group, a first joint portion located at a downstream end portion of the first exhaust sub-collecting pipe, and a second joint portion located at a downstream end portion of the second exhaust sub-collecting pipe.

10 Claims, 24 Drawing Sheets

EXHAUST PIPE COLLECTING STRUCTURE OF MULTIPLE CYLINDER ENGINE AND PERSONAL WATERCRAFT

BACKGROUND OF THE INVENTION

1. Field of the Invention

The present invention relates to an exhaust pipe collecting structure obtained by extending exhaust pipes from exhaust ports of cylinders of a multi-cylinder engine, for example, a four-cylinder engine, and by collecting these exhaust pipes, and a personal watercraft (PWC) which is equipped with the engine having the exhaust pipe collecting structure and is configured to eject water rearward and plane on a water surface as the resulting reaction.

2. Description of the Related Art

A multi-cylinder engine unit, for example, a four-cylinder engine unit, is mounted as a motor in various vehicles including jet-propulsion personal watercraft. In recent years, the jet-propulsion personal watercraft have been widely used in leisure, sport, rescue activities, and the like. The personal watercraft is configured to have a water jet pump that pressurizes and accelerates water sucked from a water intake generally provided on a bottom hull surface and ejects it rearward from an outlet port. As the resulting reaction, a body of the jet-propulsion personal watercraft is propelled. In the jet-propulsion personal watercraft, a steering nozzle provided behind the outlet port of the water jet pump is swung either to the right or to the left by operating a bar-type steering handle to the right or to the left, to change the ejection direction of the water to the right or to the left, thereby turning the watercraft to the right or to the left.

In a multi-cylinder engine unit, such as the four-cylinder engine unit, exhaust pipes extend from exhaust ports of the cylinders and are collected into one exhaust passage, and a downstream end of the exhaust passage is connected to a muffler. An exhaust gas is discharged outside through the muffler. Such a multi-cylinder engine unit typically uses an exhaust pipe collecting structure in which a plurality of exhaust pipes (four or more pipes) are collected into one exhaust passage in the vicinity of the engine. The exhaust pipe collecting structure is generally formed in an exhaust manifold.

When an exhaust pipe collecting structure is accommodated in a relatively wide engine room such as in an automobile, the four exhaust pipes may be formed having a two-part parting plane that is one continuous plane and passes through the location where the exhaust pipes are collected. The continuous plane may be a flat, but is not necessarily so. However, when the exhaust pipe collecting structure is accommodated in a limited space around the engine of the personal watercraft or small all-terrain vehicle, exhaust efficiency and efficient use of the space should be taken into account. This makes it difficult for the parting plane of the exhaust pipes to be located on one continuous plane, passing through the location where the exhaust pipes are collected. Consequently, casting using a mold also becomes difficult.

In addition, in the personal watercraft, extension of the total length of the exhaust passages, which leads to higher performance of the engine unit, is not accomplished because of the limited space. Alternatively, in order to produce the same effects obtained by extension of the exhaust passages by surrounding the exhaust passage with a water jacket, the temperature of the exhaust passages is reduced to cause a sound speed of exhaust gases flowing inside the exhaust passages to be reduced. However, to form the water jacket, it is necessary to form a double-walled structure in the exhaust pipes and the exhaust passages, which requires more complex technology of casting using the mold.

As described above, when the parting plane of the exhaust pipe collecting structure is not located on one continuous plane in casting, casting using the mold becomes difficult. As another alternative solution to this, steel pipes are welded to be formed into the exhaust pipe collecting structure. In this case, because a plurality of parts (e.g., pipe members) having complex shapes are welded, productivity is reduced as compared to the exhaust pipe collecting structure cast using the mold. In addition, in order to manufacture the exhaust pipe collecting structure having the double-walled structure to form the water jacket around the exhaust passage, difficult works need to be conducted.

Further, in the exhaust pipe collecting structure, at a joint portion where the exhaust passages of the exhaust pipes are collected into one exhaust passage or in the vicinity thereof, the shapes of the exhaust passages having an equal total length are varied from one another. In this structure, the variation in the shapes of the arranged exhaust passages makes the entire exhaust pipe collecting structure bulky, which imposes limitation on arrangement of the water jacket.

SUMMARY OF THE INVENTION

The present invention addresses the above-described conditions, and an object of the present invention is to provide an exhaust pipe collecting structure having a double-walled structure provided with a water jacket on its periphery, which is manufactured by casting using a mold. Another object of the present invention is to provide an exhaust pipe collecting structure having a dimension reduced in a desired direction while maintaining cooling capability. A further object of the present invention is to provide an exhaust pipe collecting, structure provided with a water jacket having high cooling capability regardless of arrangement of collected exhaust pipes at a location where exhaust pipes of cylinders are joined to one another or at a location spaced apart therefrom. A further object of the present invention is to provide a personal watercraft that uses the exhaust pipe collecting structure and has a high exhaust efficiency.

According to the present invention, there is provided an exhaust pipe collecting structure for a multi-cylinder engine unit having multiple cylinders (four or more cylinders), in which exhaust pipes extend from at least four cylinders of the multiple cylinders and are collected into one exhaust passage at a location downstream in a flow of exhaust gases, the structure comprising a first exhaust pipe group and a second exhaust pipe group, each of which is comprised of two exhaust pipes selected from four exhaust pipes respectively connected to the four cylinders; a first exhaust sub-collecting pipe cast integrally with the first exhaust pipe group; a second exhaust sub-collecting pipe cast integrally with the second exhaust pipe group; a first joint portion located at a downstream end portion of the first exhaust sub-collecting pipe; and a second joint portion located at a downstream end portion of the second exhaust sub-collecting pipe, wherein the first joint portion and the second joint portion are joined to each other to allow the exhaust gases discharged from the four exhaust pipes to be led into one exhaust passage.

In accordance with the exhaust pipe collecting structure so configured, two-part parting planes of the first and second exhaust sub-collecting pipes into which the exhaust pipes of at least four cylinders partially forming the exhaust pipe collecting structure are collected, are each located on one continuous plane. Therefore, the first and second exhaust sub-collecting pipes can be cast using a two-part mold. Since the two-part parting plane is located on one continuous plane, a double-walled structure provided with a water jacket around the exhaust passage is formed in the exhaust pipe collecting structure by inserting cores into an inside of the two-part mold. In addition, at downstream end portions of the first and second exhaust sub-collecting pipes, first and second joint portions are formed to join these downstream end portions into one exhaust passage. Therefore, by merely joining the first and second joint portions to each other, one exhaust passage is easily formed. Further, when the exhaust pipe collecting structure is removed from the engine, the structure is disassembled into the first and second exhaust sub-collecting pipes by releasing the joint of the first and second joint portions, and thereafter, the first and second exhaust sub-collecting pipes are each removed as individual members.

The exhaust pipe collecting structure gains high exhaust efficiency. In addition, the exhaust pipe collecting structure having the water jacket on its periphery can be easily cast using the mold. The exhaust pipe collecting structure achieves high performance and productivity.

Preferably, in the exhaust pipe collecting structure, the first joint portion has a first semicylindrical peripheral wall opened toward the second joint portion with a parting line extending along a direction of the flow of the exhaust gases, the second joint portion has a second semicylindrical peripheral wall opened toward the first joint portion with a parting line extending along a direction of the flow of the exhaust gases, and the first and second semicylindrical peripheral walls are joined to be formed into the one exhaust passage such that an opening of the first joint portion and an opening of the second joint portion face each other and the direction of the flow of exhaust gases of the first joint portion corresponds with the direction of the flow of exhaust gases of the second joint portion.

Preferably, the exhaust pipe collecting structure further comprises a rubber tube that covers an outer periphery of the first and second semicylindrical peripheral walls that are joined to face each other. In this structure, a space between the rubber tube and the peripheral walls serves as the water jacket. In particular, at the parting plane, water leakage from the joint faces should be inhibited. By forming the water jackets with the rubber tube covering the outer periphery, water leakage to the outside is effectively inhibited.

According to the present invention, there is provided an exhaust pipe collecting structure for a multi-cylinder engine unit having multiple cylinders, in which exhaust pipes extend from at least four cylinders of the multiple cylinders and are collected into one exhaust passage at a location downstream of the exhaust pipes in a flow of exhaust gases, the structure comprising a first exhaust pipe group and a second exhaust pipe group each of which is comprised of two exhaust pipes selected from four exhaust pipes respectively connected to the four cylinders; a first exhaust sub-collecting pipe cast integrally with the first exhaust pipe group; a second exhaust sub-collecting pipe cast integrally with the second exhaust pipe group; a first joint portion located at a downstream end portion of the first exhaust sub-collecting pipe; and a second joint portion located at a downstream end portion of the second exhaust sub-collecting pipe, the first and second joint portions respectively having outer walls joined to each other to allow exhaust passages of the first and second joint portions to be defined by the outer walls, wherein the first joint portion and the second joint portion are joined to each other to allow the first and second exhaust sub-collecting pipes to be integral with each other as seen from outside, an exhaust gas discharged from the first exhaust pipe group is led into the exhaust passage of the first joint portion and an exhaust gas discharged from the second exhaust pipe group is led into the exhaust passage of the second joint portion, and exhaust passages inside the joint portions are arranged adjacently.

In accordance with the exhaust pipe collecting structure, two-part parting planes of the first exhaust sub-collecting pipe and the second exhaust sub-collecting pipe formed by collecting exhaust pipes of at least four cylinders partially forming the exhaust pipe collecting structure are each present on one continuous plane. As a result, the first exhaust sub-collecting pipe and the second exhaust pipe collecting pipe are cast using a mold. Since the two-part parting plane is located on one continuous plane, a double-walled structure provided with a water jacket around the exhaust passage is formed in the exhaust pipe collecting structure by inserting cores into the two-part mold. In addition, at the downstream end portions of the first exhaust sub-collecting pipe and the second exhaust sub-collecting pipe, the first and second joint portions have the outer walls (joint faces) by which the downstream end portions are joined to form two adjacent exhaust passages. Therefore, by joining the first and second joint portions to bring their outer walls into contact with each other, the exhaust sub-collecting pipes are formed into the two adjacent exhaust passages. Further, when the exhaust pipe collecting structure is removed from the engine, the structure is disassembled into the first and second exhaust sub-collecting pipes by releasing the joint of their outer walls and, thereafter, the first and second exhaust sub-collecting pipes are each removed as individual members. The exhaust pipe collecting structure gains high exhaust efficiency. In addition, the structure having the water jacket in its periphery can be easily cast using the mold. The exhaust pipe collecting structure achieves high performance and productivity.

Preferably, the exhaust pipe collecting structure further comprises a connecting tube located downstream of the first and second joint portions, for collecting the exhaust gases flowing through the exhaust passages inside the first and second joint portions. With the connecting tube, four exhaust pipes are collected into one exhaust passage.

Preferably, in the exhaust pipe collecting structure, the connecting tube is cast by a two-part mold with a parting line extending along a longitudinal direction of the connecting tube. In this structure, the connecting tube is easily connected to the downstream end portions of the two adjacent exhaust passages. As a result, the exhaust pipe collecting structure is easily attached to and removed from the engine within a limited space of the engine room. Moreover, the connecting tube is easily cast using the mold and is formed to have the double-walled structure.

Preferably, in the exhaust pipe collecting structure, the first and second exhaust sub-collecting pipes and the connecting tube have double-walled structures to have cooling passages between walls. The cooling passages allows the exhaust gases in the connecting tube to be effectively cooled. With the cooling passages, an exhaust system gains high exhaust efficiency achieved by extension of the total length of the exhaust passages.

According to the present invention, there is further provided an exhaust pipe collecting structure for a multi-cylinder engine unit having multiple cylinders, in which exhaust pipes extend from cylinders of the multiple cylinders and are collected into one exhaust passage at a location downstream of the exhaust pipes in a flow of exhaust gases, the structure comprising a connecting tube; and an exhaust manifold attached on the connecting tube, the exhaust manifold including a first exhaust sub-collecting pipe and a second exhaust sub-collecting pipe located on downstream portions of exhaust pipes extending from the cylinders, the first and second exhaust sub-collecting pipes being configured to have internal independent exhaust passages of the exhaust gases flowing from the exhaust pipes, the first and second exhaust sub-collecting pipes being integral with each other at least at their joint portions as seen from outside; and a first water jacket formed at the joint portions to have a water flow cross-section elongate in a direction perpendicular to a casting parting plane forming a boundary of the first and second exhaust sub-collecting pipes as seen in a cross-sectional view.

In accordance with the exhaust pipe collecting structure, the water jacket that is elongate in the direction perpendicular to the casting parting plane, for increased surface area of the water jacket, has sufficient cooling capability and, because of the absence of the water jacket between the two exhaust sub-collecting pipes, it is possible to reduce the dimension of the exhaust pipe collecting structure in the direction in which the two exhaust sub-collecting pipes are arranged.

Preferably, in the exhaust pipe collecting structure, the multiple cylinders are four cylinders, the first exhaust sub-collecting pipe is configured to have internal independent exhaust passages of the exhaust pipes of two cylinders selected from the four cylinders, and the second exhaust sub-collecting pipe is configured to have internal independent exhaust passages of the exhaust pipes of the remaining two cylinders, the first water jacket is formed at the joint portions where the first and second exhaust sub-collecting pipes are integral with each other, to have the water flow in a cross-section that is elongate in a direction from a region between the two exhaust pipes of the first exhaust sub-collecting pipe to a region between the two exhaust pipes of the second exhaust sub-collecting pipe so as to cross the casting parting plane forming the boundary of the first and second exhaust sub-collecting pipes as seen in a cross-sectional view.

In accordance with the exhaust pipe collecting structure, the water jacket that is elongate in the direction perpendicular to the casting parting plane, for increased surface area of the water jacket, has sufficient cooling capability and, because of the absence of a water jacket between the first and second exhaust sub-collecting pipes, it is possible to reduce the dimension of the exhaust pipe collecting structure. As a result, the exhaust pipe collecting structure having a three-dimensional configuration is accommodated in a narrow space. In the exhaust pipe collecting structure so configured, the dimension of the exhaust pipe collecting structure protruded from the side portion of the engine is reduced and, therefore, such a structure is favorably employed in the personal watercraft having a limited lateral space.

Preferably, in the exhaust pipe collecting structure, the exhaust pipe collecting structure is integrally cast by locating the casting parting plane of the exhaust pipe collecting structure within one continuous plane. Thereby, it is possible to achieve the exhaust pipe collecting structure provided with a water jacket having a desired water flow cross-sectional area regardless of variation in the shapes of the arranged exhaust passages.

Preferably, in the exhaust pipe collecting structure, the connecting tube comprises a plurality of connecting exhaust passages communicating with the exhaust pipes of the exhaust manifold and being merged into a single exhaust passage; and a second water jacket extending to a position upstream of the single exhaust passage so as to substantially define two groups of the connecting exhaust passages.

In this structure, by positioning the merging point of connecting exhaust passages on the downstream side, the water jacket can be extended to the vicinity of the merging point of the connecting exhaust passages. Therefore, the exhaust pipe collecting structure having high cooling capability is achieved without being affected by arrangement of the exhaust passages.

Preferably, in the exhaust pipe collecting structure, the connecting exhaust passages are collected at a location inside the connecting tube provided downstream of the exhaust manifold having the exhaust passages. Alternatively, part of the connecting exhaust passages may be collected at a location inside the exhaust manifold provided upstream of the connecting tube as seen from outside.

Preferably, in the exhaust pipe collecting structure, the first water jacket is formed in part of the exhaust sub-collecting pipes so as to substantially define exhaust passages of the exhaust sub-collecting pipes as seen in a cross-sectional view, and at a connecting portion between the exhaust manifold and the connecting tube, the first water jacket of the exhaust manifold is connected to the second water jacket of the connecting tube such that a longitudinal axis of a water flow cross-section of the first water jacket of the exhaust manifold crosses a longitudinal axis of a water flow cross-section of the second water jacket of the connecting tube. In this structure, the dimension of the exhaust manifold protruded from the side portion of the engine is reduced and the cooling water flows to the downstream end portion of the connecting tube.

Preferably, in the exhaust pipe collecting structure, a water flow portion, where the water flow cross-section of the first water jacket of the exhaust manifold and the water flow cross-section of the second water jacket of the connecting tube overlap with each other with their longitudinal axes crossing each other, is enlarged. In other words, at the position where the first water jacket of the exhaust manifold and the second water jacket of the connecting tube are connected to each other, the water flow portion is partially enlarged. In this structure, at the position where the two water jackets are connected to each other with their longitudinal axes crossing each other, sufficient water flows.

The above and further objects and features of the invention will more fully be apparent from the following detailed description with accompanying drawings.

DETAILED DESCRIPTION OF THE PREFERRED EMBODIMENTS

Hereinafter, preferred embodiments of an exhaust pipe collecting structure of the present invention will be described with reference to the accompanying drawings. Here, a jet-propulsion personal watercraft will be described.

Figure 26:
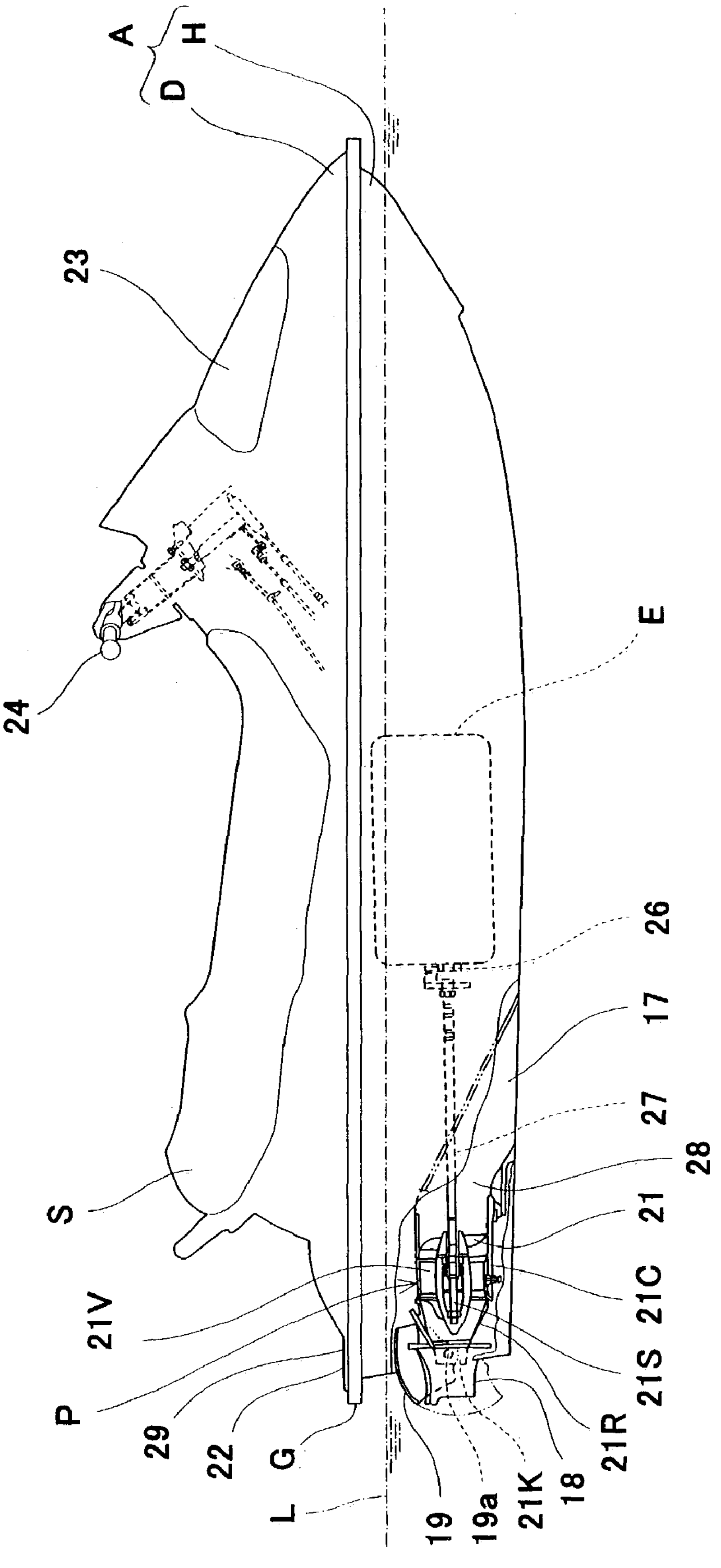
FIG. 26 is a side view showing a personal watercraft having the exhaust pipe collecting structure, according to the present invention.
Figure 27:
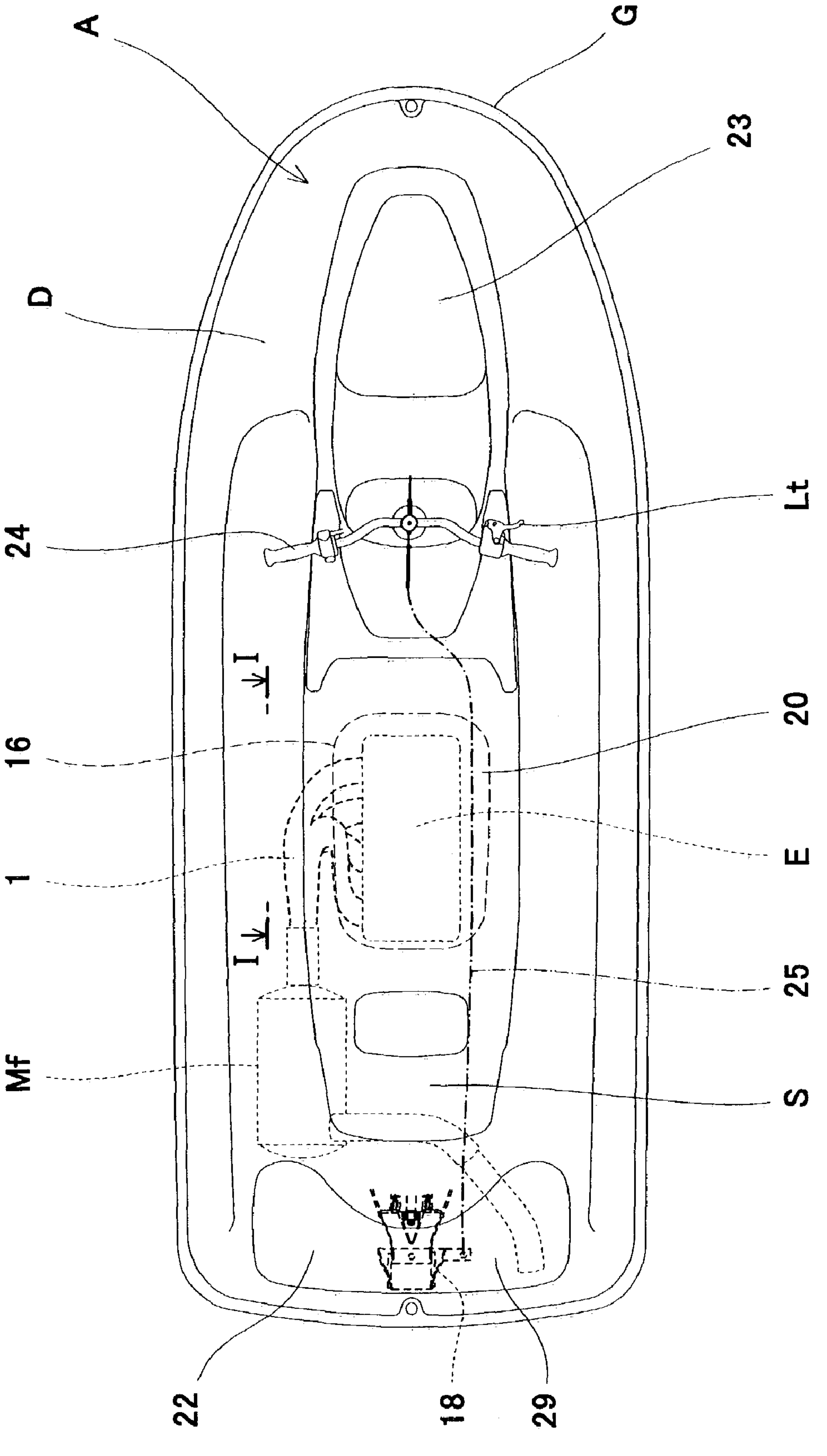
FIG. 27 is a plan view showing the personal watercraft in FIG. 26.

In FIGS. 26 and 27, reference numeral A denotes a body of the personal watercraft. The body A comprises a hull A and a deck D covering the hull H from above. A line at which the hull H and the deck D are connected over the entire perimeter thereof is called a gunnel line G. The gunnel line G is located above the waterline L of the personal watercraft in a normal condition. As shown in FIG. 27, an opening 16, which has a substantially rectangular shape seen from above, is formed at a relatively rear section of the deck D such that it extends in the longitudinal direction of the body A, and a riding seat S is mounted above the opening 16 such that it covers the opening 16 from above as shown in FIGS. 26 and 27.

An engine unit Eu is contained in a chamber (engine room) 20 surrounded by the hull H and the deck D below the seat S and having a convex-shape in a cross-section of the body A.

In this embodiment, the engine unit Eu is a multi-cylinder (four-cylinder) four-cycle engine unit. As shown in FIG. 26, a crankshaft 26 of the engine E is mounted along the longitudinal direction of the body A. An output end of the crankshaft 26 is rotatably coupled integrally with a pump shaft 21S of a water jet pump P through a propeller shaft 27. An impeller 21 is mounted on the output shaft 21S of the water jet pump P. The impeller 21 is covered with a pump casing 21C on the outer periphery thereof. A water intake 17 is provided on the bottom of the hull H. The water is sucked from the water intake 17 and fed to the water jet pump P through a water intake passage 28. The water jet pump P pressurizes and accelerates the water. The pressurized and accelerated water is discharged through a pump nozzle 21R having a cross-sectional area of flow gradually reduced rearward, and from an outlet portion 21K provided on the downstream end of the pump nozzle 21R, thereby obtaining the propulsion force.

In FIG. 26, reference numeral 21V denotes fairing vanes for fairing water flow inside the water jet pump P. As shown in FIGS. 26 and 27, reference numeral 24 denotes a bar-type steering handle. By operating the steering handle 24 to the right or to the left, the steering nozzle 18 provided behind the pump nozzle 21R swings to the right or to the left through a wire cable 25 as represented by a dashed line. The watercraft can be turned to any desired direction while the water jet pump P is generating the propulsion force. A throttle lever Lt in FIG. 27 serves to adjust an engine speed of the engine E.

As shown in FIG. 26, a bowl-shaped reverse deflector 19 is provided above the rear side of the steering nozzle 18 such that it can swing downward around a horizontally mounted swinging shaft 19*a*.

The deflector 19 is swung downward toward a lower position behind the steering nozzle 18 to deflect the water ejected from the steering nozzle 18 forward, and as the resulting reaction, the personal watercraft moves rearward.

In FIGS. 26 and 27, reference numeral 22 denotes a rear deck. The rear deck 22 is provided with an operable hatch cover 29. A rear compartment (not shown) with a small capacity is provided under the hatch cover 29. Reference numeral 23 denotes a front hatch cover. A front compartment (not shown) is provided under the front hatch cover 23 for storing equipment and the like.

Embodiment 1

Figure 2:
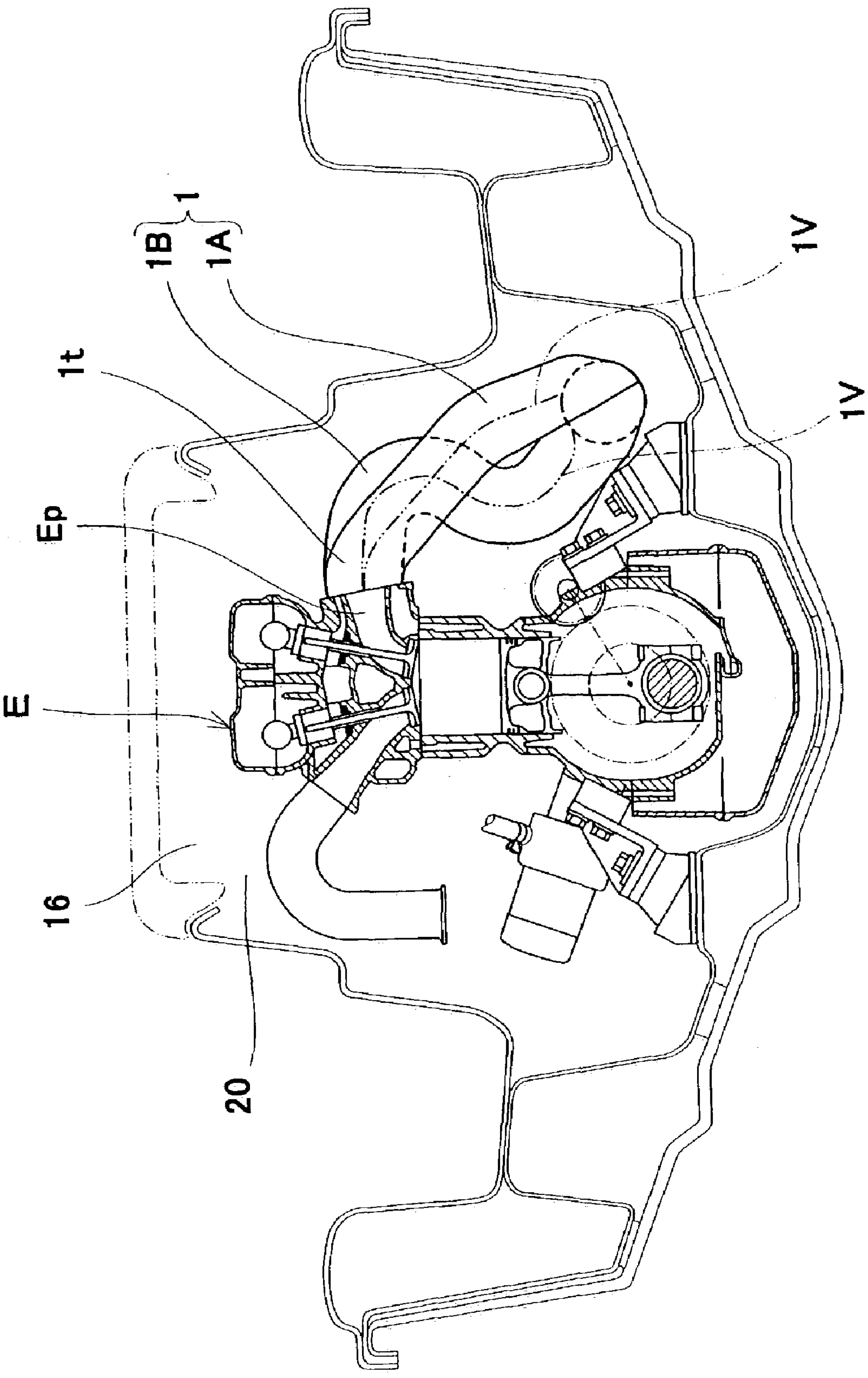
FIG. 2 is a view taken in the direction of arrows along line II-II in FIG. 1, showing the engine unit in FIG. 1 mounted in the personal watercraft.

In the four-cylinder engine unit Eu of the personal watercraft according to this embodiment, ignition takes place in the order of the first cylinder, the second cylinder, the fourth cylinder, and the third cylinder. As defined herein, the engine unit Eu has the engine E, an exhaust pipe collecting structure (corresponding to the exhaust manifold 1), etc. Since exhaust gases flow from upstream to downstream, upstream ends 1*t* of exhaust pipes 1M (1M1 to 1M4) of the exhaust pipe collecting structure 1 are connected to exhaust ports Ep (see FIG. 2) of cylinders of the engine E.

Figure 3:
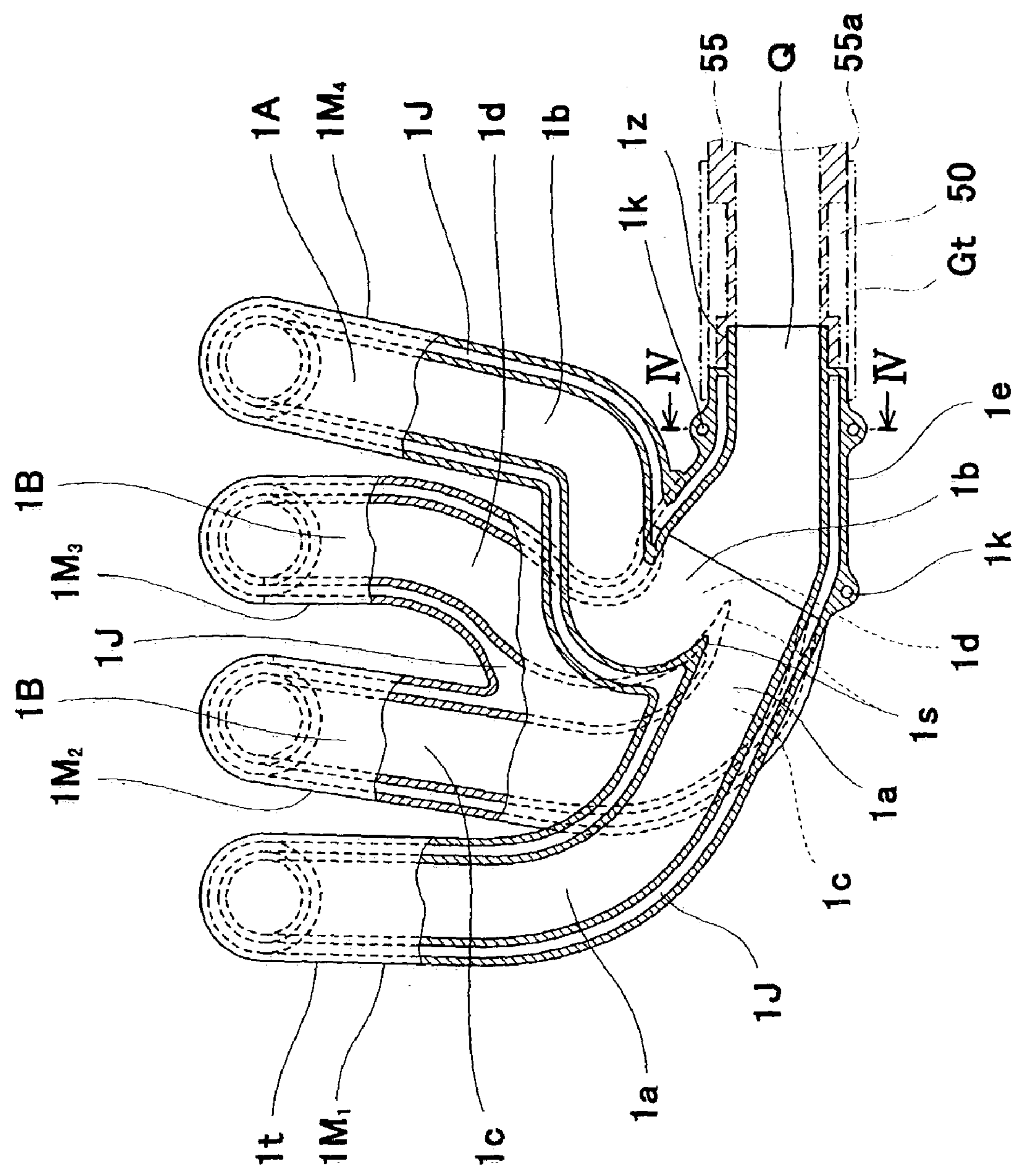
FIG. 3 is an enlarged side view showing a configuration of the exhaust pipe collecting structure in FIG. 1.
Figure 5:
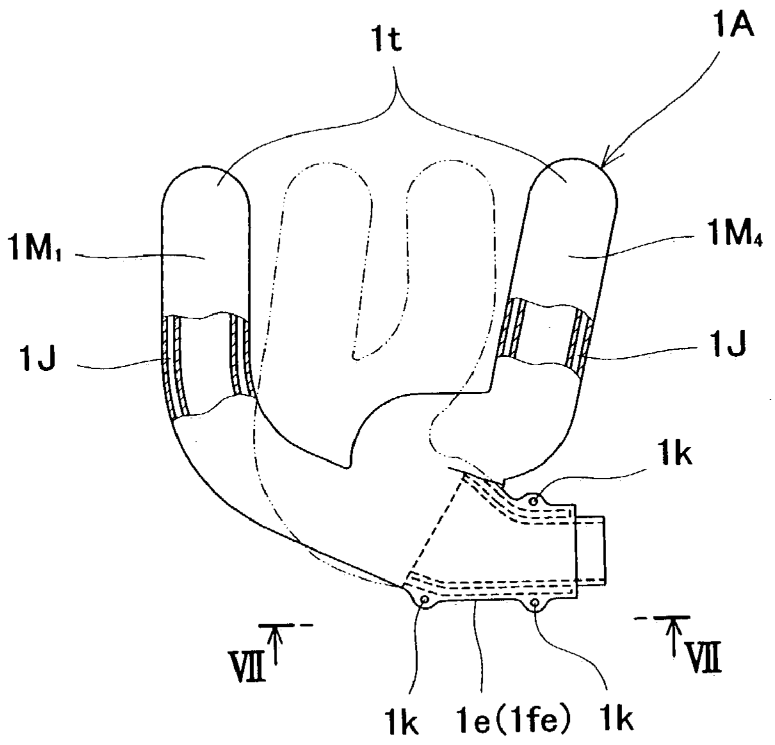
FIG. 5 is a side view showing a structure of a first exhaust sub-collecting pipe of the exhaust pipe collecting structure in FIGS. 1 and 3.
Figure 6:
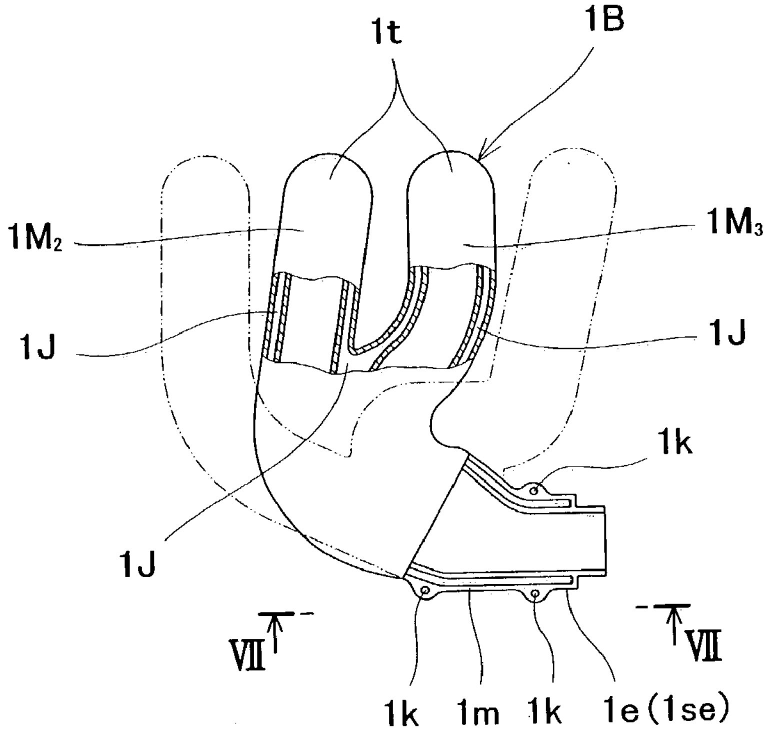
FIG. 6 is a side view showing a structure of a second exhaust sub-collecting pipe of the exhaust pipe collecting structure in FIGS. 1 and 3.

The exhaust pipe collecting structure 1 has a first exhaust sub-collecting pipe 1A comprised of integral exhaust pipes (see FIGS. 3 and 5) and a second exhaust sub-collecting pipe 1B comprised of integral exhaust pipes (see FIGS. 3 and 6). The first exhaust sub-collecting pipe 1A has two exhaust pipes 1M (1M1, 1M4). The upstream end 1*t* of the exhaust pipe 1M1 is attached to the exhaust port Ep (see FIG. 2) of the first cylinder of the engine E by means of a bolt (not shown), and the upstream end 1*t* of the exhaust pipe 1M4 is attached to the exhaust port Ep (see FIG. 2) of the fourth cylinder of the engine E by means of a bolt (not shown).

The second exhaust sub-collecting pipe 1B has two exhaust pipes 1M (1M2, 1M3). The upstream end 1*t* of the exhaust pipe 1M2 is attached to the exhaust port Ep (see FIG. 2) of the second cylinder of the engine E by means of a bolt (not shown), and the upstream end 1*t* of the exhaust pipe 1M3 is attached to the exhaust port Ep (see FIG. 2) of the third cylinder of the engine E by means of a bolt (not shown).

A first joint portion 1*e* is provided at a downstream end portion of the first exhaust sub-collecting pipe 1A. As shown in a left-side portion in FIG. 4, the first joint portion 1*fe* has a semicylindrical peripheral wall opened toward a second joint portion 1*se* mentioned later. In other words, the first joint portion 1*fe* has a substantially semicircular cross-section with a circular-arc portion located on the left side in FIG. 4. The second joint portion 1*se* is provided at a downstream end portion of the second exhaust sub-collecting pipe 1B. As shown in a right-side portion in FIG. 4, the second joint portion 1 se has a semicylindrical peripheral wall opened toward the first joint portion 1*fe*. In other words, the second joint portion 1*se* has a substantially semicircular cross-section with a circular-arc portion located on the right side in FIG. 4.

Figure 4:
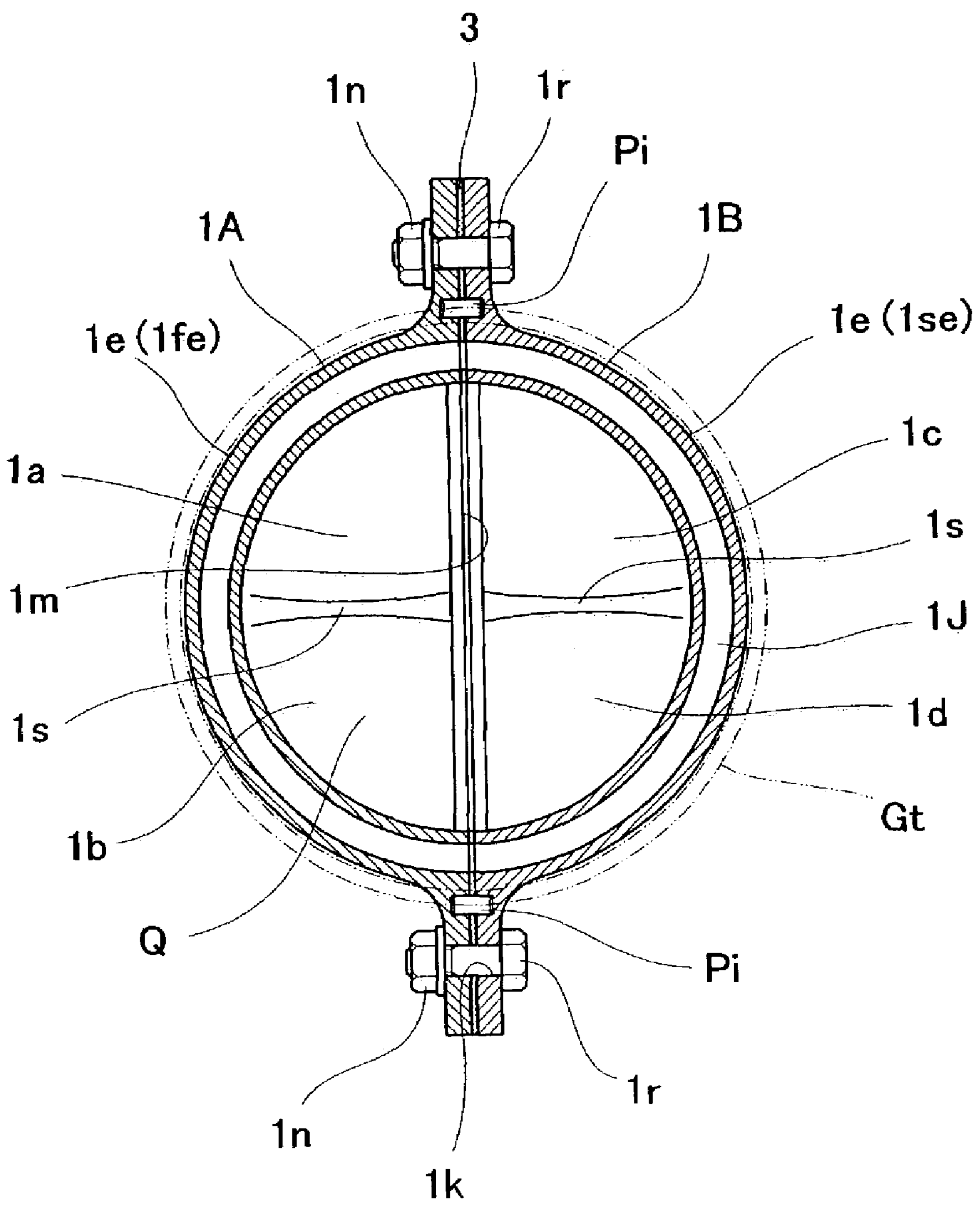
FIG. 4 is a view taken in the direction of arrows along line IV-IV in FIG. 3, showing a structure of joint portions of downstream ends of the exhaust pipe collecting structure.

As shown in FIG. 4, the first joint portion 1*fe* and the second joint portion 1*se* are combined to each other to allow their openings to be closed by their opposed joint portions 1*e*. The combined joint portions 1*e* form a wall face of a cylindrical exhaust pipe having a circular cross-section.

As shown in FIG. 4, joint faces 1*m* of the first and second joint portions 1*fe*, 1*se* of the first and second exhaust sub-collecting pipes 1A and 1B have a plurality of positioning pin holes through which knock pins Pi are inserted for accurate relative positioning. An extended face of the joint face 1*m* has holes 1*k* through which joint bolts are inserted. The first and second joint portions 1*fe*, 1*se* are securely fastened to each other by means of bolts 1*r* and nuts 1*n* through the holes 1*k*. Further, the joint face 1*m* has sealing packings 3.

At the above joint portions 1*e*, downstream ends of the exhaust pipes 1M are visible as seen from the downstream ends of exhaust passages of the joint portions 1*e*. Specifically, an exhaust passage 1*a* connected at its upstream end to the exhaust port Ep (see FIG. 2) of the fourth cylinder is opened in an upper portion of the substantially semicircular first exhaust sub-collecting pipe 1A shown on the left side in FIG. 4, and an exhaust passage 1*b* connected at its upstream end to the exhaust port Ep (see FIG. 2) of the first cylinder is opened in a lower portion of the first exhaust sub-collecting pipe 1A. And, an exhaust passage 1*c* connected at its upstream end to the exhaust port Ep (see FIG. 2) of the third cylinder is opened in an upper portion of the substantially semicircular second exhaust sub-collecting pipe 1B shown on the right side in FIG. 4 and an exhaust passage Id connected at its upstream end to the exhaust port Ep (see FIG. 2) of the second cylinder in a lower portion of the second exhaust sub-collecting pipe 1B. In FIG. 4, Is denotes a separating wall between the exhaust passage 1*a* and the exhaust passage 1*b* and a separating wall between the exhaust passage 1*c* and the exhaust passage 1*d*.

As described above, the downstream end portion of the first exhaust sub-collecting pipe 1A and the downstream end portion of the second exhaust sub-collecting pipe 1B are joined at the joint face 1*m* of the joint portions 1*e*, thereby forming a substantially cylindrical exhaust passage Q (see. FIG. 3) having a circular cross-section. The exhaust passage Q has a peripheral wall that isolates its inside from outside.

In the exhaust pipe collecting structure 1 configured as described above, exhaust gases flowing from the four cylinders are collected into one exhaust passage Q (see FIG. 3) formed by the joint portions 1*e*.

In accordance with the exhaust pipe collecting structure 1 having the above configuration, since the parting plane 1V of the first exhaust sub-collecting pipe 1A and the parting plane 1V of the second exhaust sub-collecting pipe 1B are each located on one continuous plane (see two-dotted lines represented by 1V in FIG. 2), the exhaust pipe collecting structure 1 having a three-dimensional configuration can be cast using a casting mold. It will be understood that, as used herein, the term "parting plane" refers to the surface along which parts of the mold splits to release a part during the casting process, and is not necessarily planar. Depending on the type of mold used, the parting plane may be flat, curved, or a combination thereof. The double-walled structure of the exhaust pipe collecting structure shown in FIGS. 3 to 6 is obtained by putting cores in the two-part casting mold. In this structure, between walls, a water jacket 1J is formed. The joint portions 1*e* are not provided with the water jacket at a downstream end portion 1*z*. As shown by two-dotted lines in FIGS. 3 and 4, a rubber tube Gt is provided to cover an outer periphery of a downstream end portion 1*z* of the joint portions 1*e* and an upstream end portion 55*a* of an exhaust pipe 55 on a muffler Mf side to form a cooling water passage (water jacket) 50 between the outer periphery and the rubber tube Gt, for cooling the tube Gt, the downstream end portion 1*a*, and the upstream end portion 55*a*.

In the above exhaust pipe collecting structure, the length of each exhaust passage can be set flexibly as required to improve exhaust efficiency. Consequently, even in a narrow space, the exhaust pipe collecting structure with high efficiency is accommodated.

When the exhaust pipe collecting structure is cast, the cooling water jackets 1J are easily formed on the wall portions of the exhaust passages, i.e., on the outer peripheries of the exhaust passages. Therefore, even when the exhaust passages are shortened according to a limited exhaust space within the engine room of the personal watercraft, the temperature of the exhaust gases is reduced by the cooling water and the speed of the exhaust gases is reduced. Thus, the exhaust pipe collecting structure produces the same effects produced by extending the exhaust passages. In other words, a power of the engine unit Eu is increased, especially, torque of the engine is increased.

Figure 1:
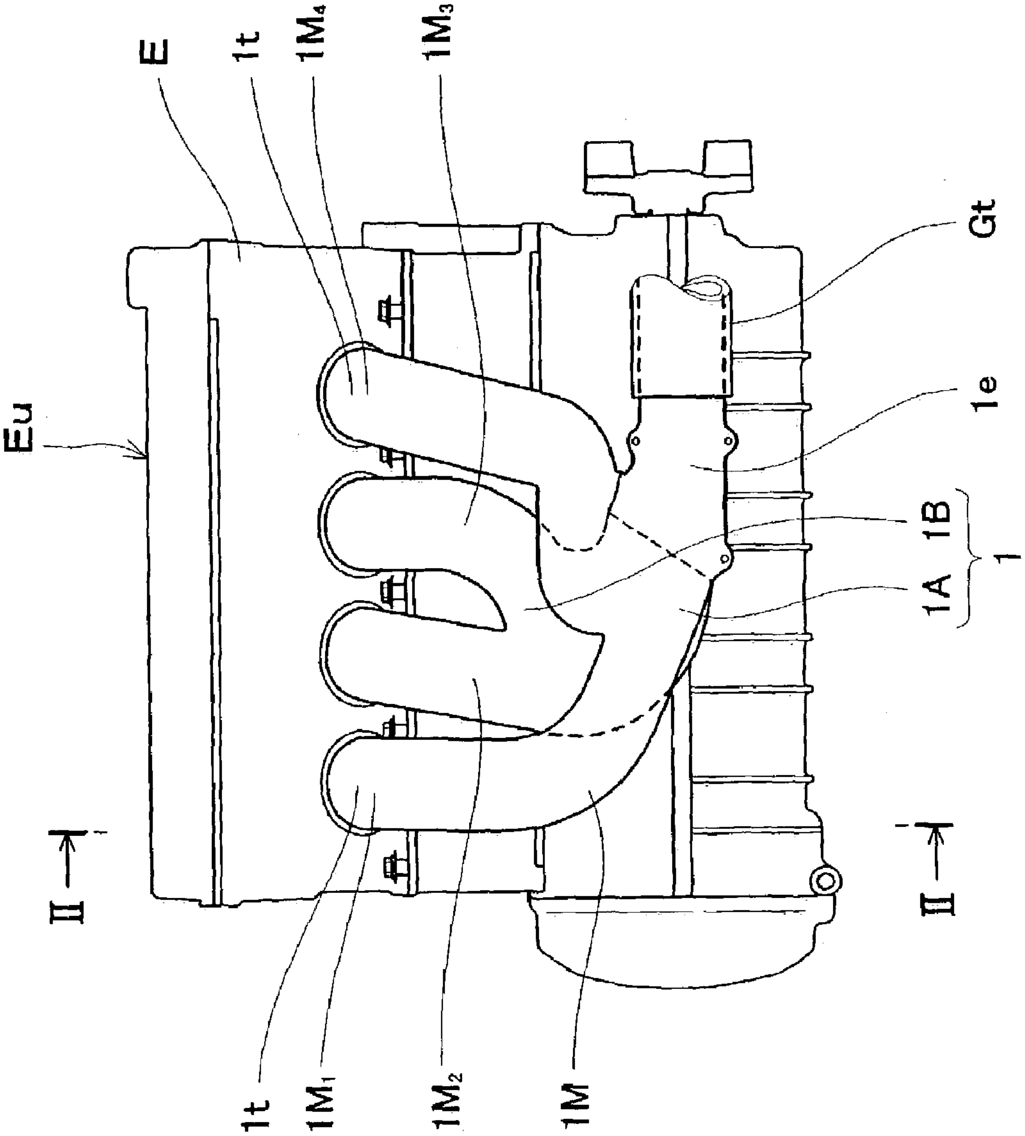
FIG. 1 is a side view of an engine unit having an exhaust pipe collecting structure according to an embodiment of the present invention, as seen from the side on which exhaust pipes are arranged; and is a view taken in the direction of arrows along line I-I in FIG. 27.

As shown in FIG. 1, the exhaust pipe collecting structure 1 is connected to the muffler side (not shown) through the rubber tube Gt extending to the downstream side. By connecting the exhaust pipe collecting structure 1 to the exhaust passage located on the downstream side through the rubber tube Gt, vibration on the engine E side is inhibited from being transmitted to the muffler or the like on the downstream side.

The engine unit Eu comprising the exhaust system having the above mentioned three-dimensional exhaust pipe collecting structure has improved exhaust inertia or the like by utilizing the relationship between the exhaust pipe collecting structure and the ignition order of the engine unit Eu. The exhaust temperature is reduced by cooling water flowing around the exhaust passages. As a result, it is possible to achieve the personal watercraft equipped with the engine unit having the exhaust pipe collecting structure with high exhaust efficiency.

Figure 7:
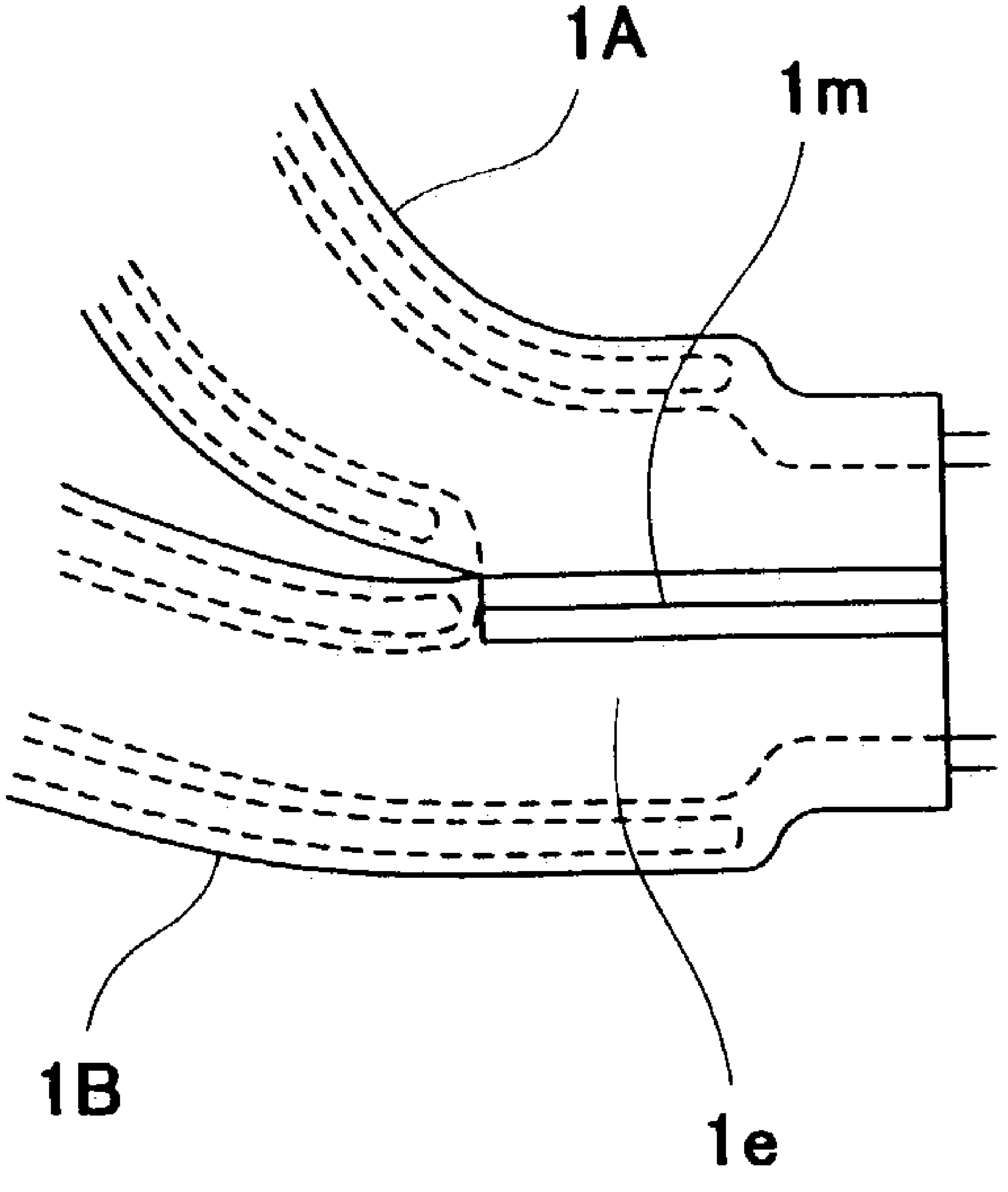
FIG. 7 is a view taken in the direction of arrows along line VII-VII in FIGS. 5 and 6, showing a portion where the first and second exhaust sub-collecting pipes in FIGS. 5 and 6 are merged.
Figure 8:
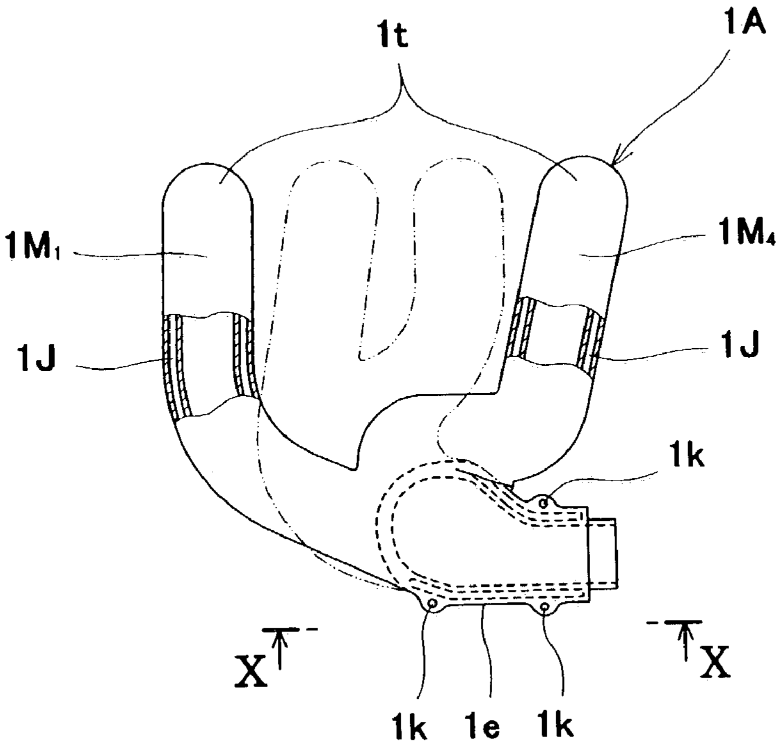
FIG. 8 is a side view showing another structure of the first exhaust sub-collecting pipe of the exhaust pipe collecting structure in FIGS. 1 and 3.
Figure 9:
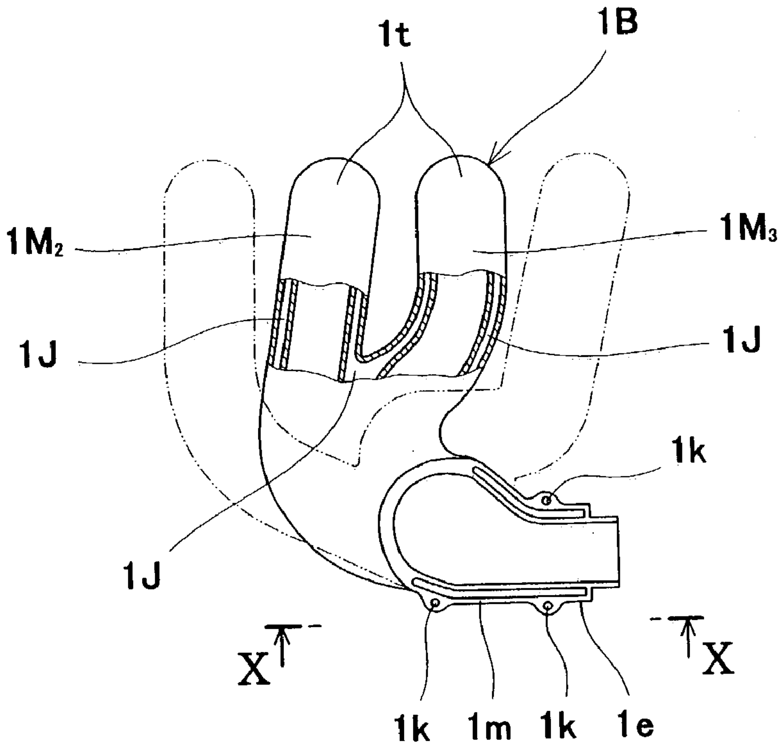
FIG. 9 is a side view showing another structure of the second exhaust sub-collecting pipe of the exhaust pipe collecting structure in FIGS. 1 and 3.
Figure 10:
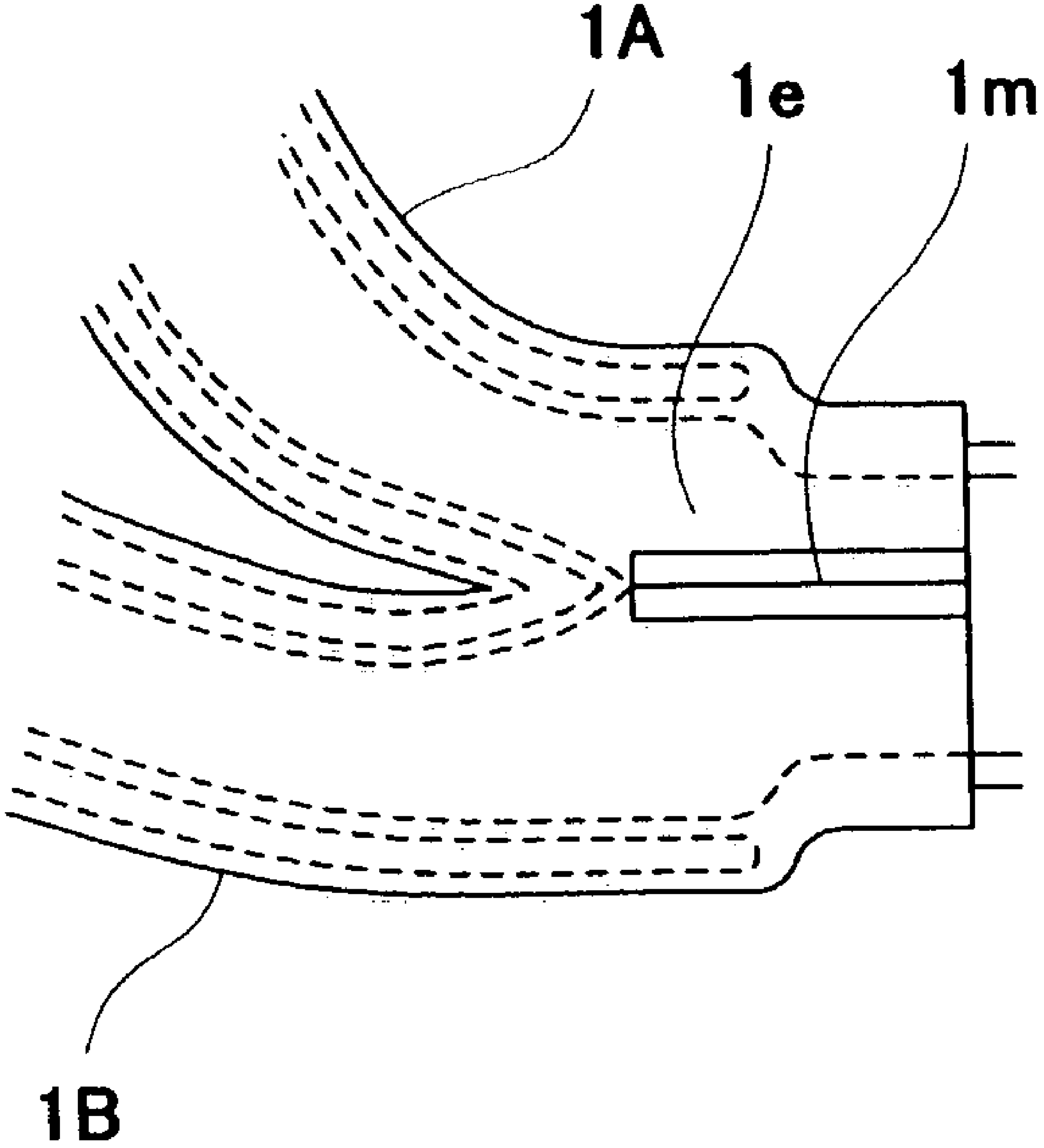
FIG. 10 is a view taken in the direction of arrows along line X-X in FIGS. 8 and 9, showing a portion where the first and second exhaust sub-collecting pipes in FIGS. 8 and 9 are merged.

The joint portion 1*fe* of the first exhaust sub-collecting pipe 1A and the joint portion 1*se* of the second exhaust pipe collecting pipe 1B may be joined by providing a step between the joint portions 1*e*, i.e., by deviating the joint face 1*m* toward the first exhaust sub-collecting pipe 1A or the second exhaust sub-collecting pipe 1B (see FIG. 7). Alternatively, as shown in FIGS. 8 to 10, the joint portions 1*e* may be combined in a stepless state.

Embodiment 2

Figure 11:
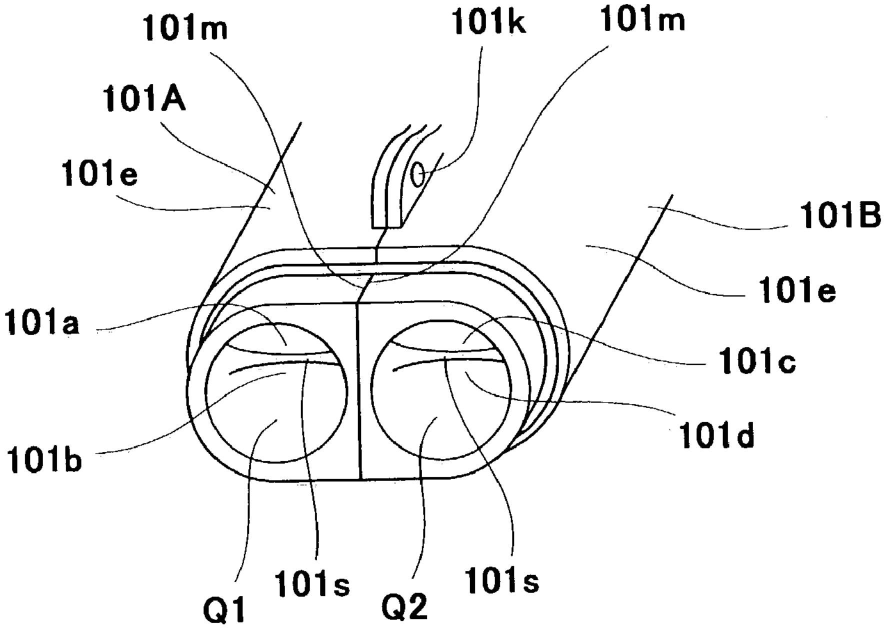
FIG. 11 is a perspective view showing another structure of a joint portion where first and second exhaust pipe collecting pipes are joined.

Referring to FIG. 11, joint portions 101*e* of first and second sub-collecting pipes 101A and 101B may be substantially cylindrical and have joint faces (outer walls) 101*m* on their side faces. In this structure, two adjacent exhaust passages Q1 and Q2 are obtained by joining the joint faces 101*m*. More specifically, the joint face 101*m* of the joint portion 101*e* of the first exhaust sub-collecting pipe 101A is provided on the right side in FIG. 11 and the joint face 101*m* of the joint portion 101*e* of the second exhaust sub-collecting pipe 101B is provided on the left side in FIG. 11. These joint faces 101*m* are in contact with each other and fastened by means of a bolt and a nut through a bolt inserting hole 101*k* provided in vertically extending portions of the joint face 101*m*. In this structure, the sealing packing is unnecessary in the joint face 101*n*.

In FIG. 11, 101*a* denotes an exhaust passage connected at its upstream end to the exhaust port of the first cylinder, 101*b* denotes an exhaust passage connected at its upstream end to the exhaust port of the fourth cylinder, 101*c* denotes an exhaust passage connected at its upstream end to the exhaust port of the second cylinder, and 101*d* denotes an exhaust passage connected at its upstream end to the exhaust port of the third cylinder. In addition, 101*s* denotes a separating wall that defines the exhaust passage 101*a* and the exhaust passage 101*b* and a separating wall that defines the exhaust passage 101*c* and the exhaust passage 101*d*.

Figure 12:
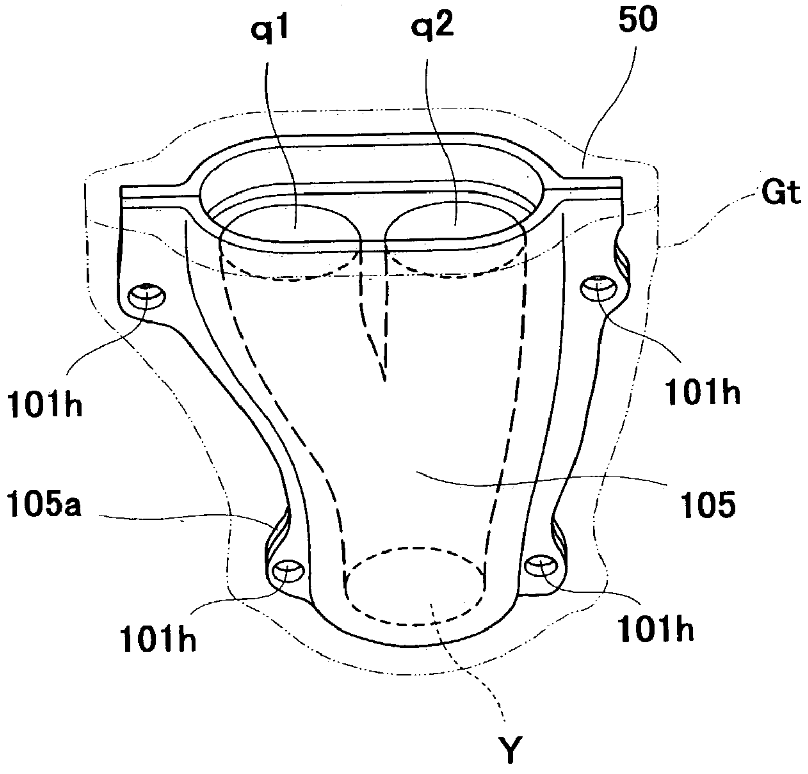
FIG. 12 is a perspective view showing a structure of a connecting tube to which downstream end portions of the first and second exhaust sub-collecting pipes in the exhaust pipe collecting structure in FIG. 11 are connected.

The exhaust passages Q1 and Q2 at the two adjacent joint portions 101*e* are connected to a connecting tube 105 to be collected into an exhaust passage Y. The connecting tube 105 has branching upstream end portions q1 and q2 connected to the downstream ends of the exhaust passages Q1 and Q2. As shown in FIG. 12, the connecting tube 105 has a two-part structure with a parting line 105*a* extending along the longitudinal direction and is provided with bolt insertion holes 101*h* to be securely fastened by means of bolts and nuts (not shown). Alternatively, although not shown, an insert-type structure that contains the downstream end portions of the joint portion 101*e* may be used.

In the above structures, as shown in FIG. 12, the rubber tube Gt covers the outer periphery from the downstream end portion of the joint portion 101*e* to the downstream end of the connecting tube 105 as indicated by two-dotted line. Thereby, a cooling water passage (water jacket) 50 is formed between the rubber tube Gt and an outer peripheral face of the joint portion 101*e* and an outer peripheral face of the connecting tube 105.

In this exhaust pipe collecting structure, the effects provided by the exhaust pipe collecting structure described in the first embodiment are obtained.

Embodiment 3

Figure 23A:
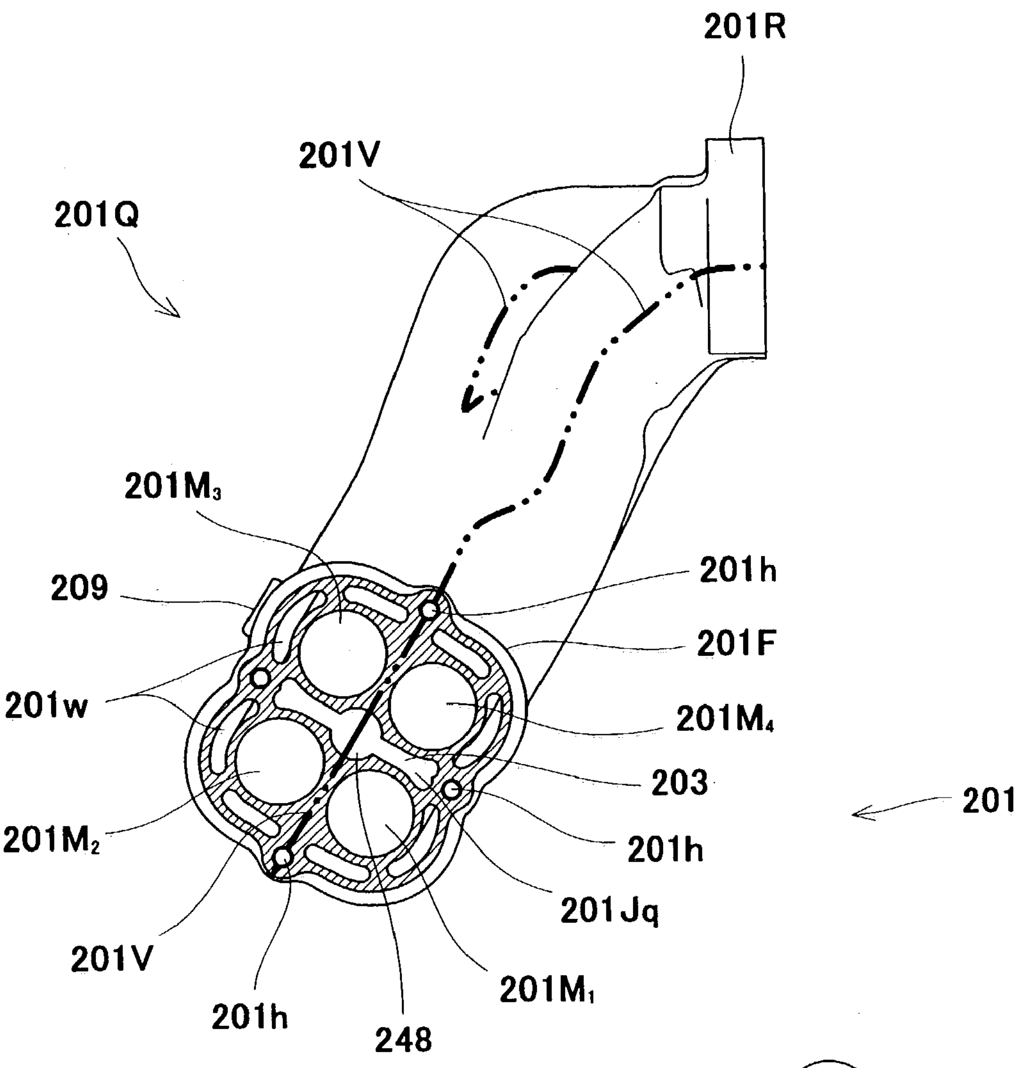
FIG. 23A is a perspective view showing another structure of the joint portion of the exhaust pipe collecting structure.
Figure 23B:
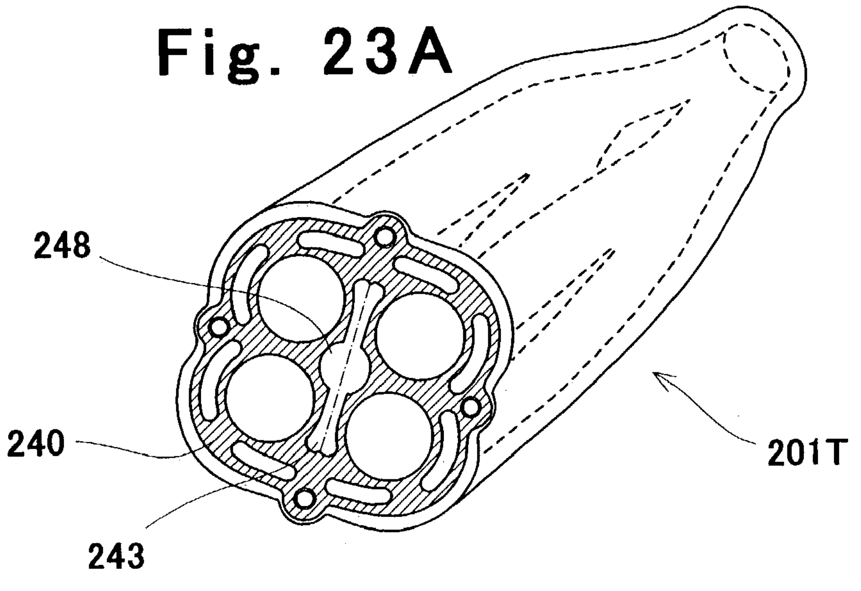
FIG. 23B is a perspective view showing a structure of a connecting tube connected to the joint portion of the exhaust pipe collecting structure in FIG. 23A.

A third embodiment of the present invention will be described. FIGS. 23A and 23B shows an exhaust pipe collecting structure 201. The exhaust pipe collecting structure 201 is used in the four-cylinder engine unit as in the exhaust pipe collecting structure in FIG. 1. The exhaust pipe collecting structure 201 comprises an exhaust manifold 201Q attached on the engine E and a connecting tube 201T (tube connecting the exhaust manifold 201Q to the muffler Mf (see FIG. 27) on the downstream side). The connecting tube 201T serves to collect a plurality of exhaust passages into one exhaust passage.

Figure 13:
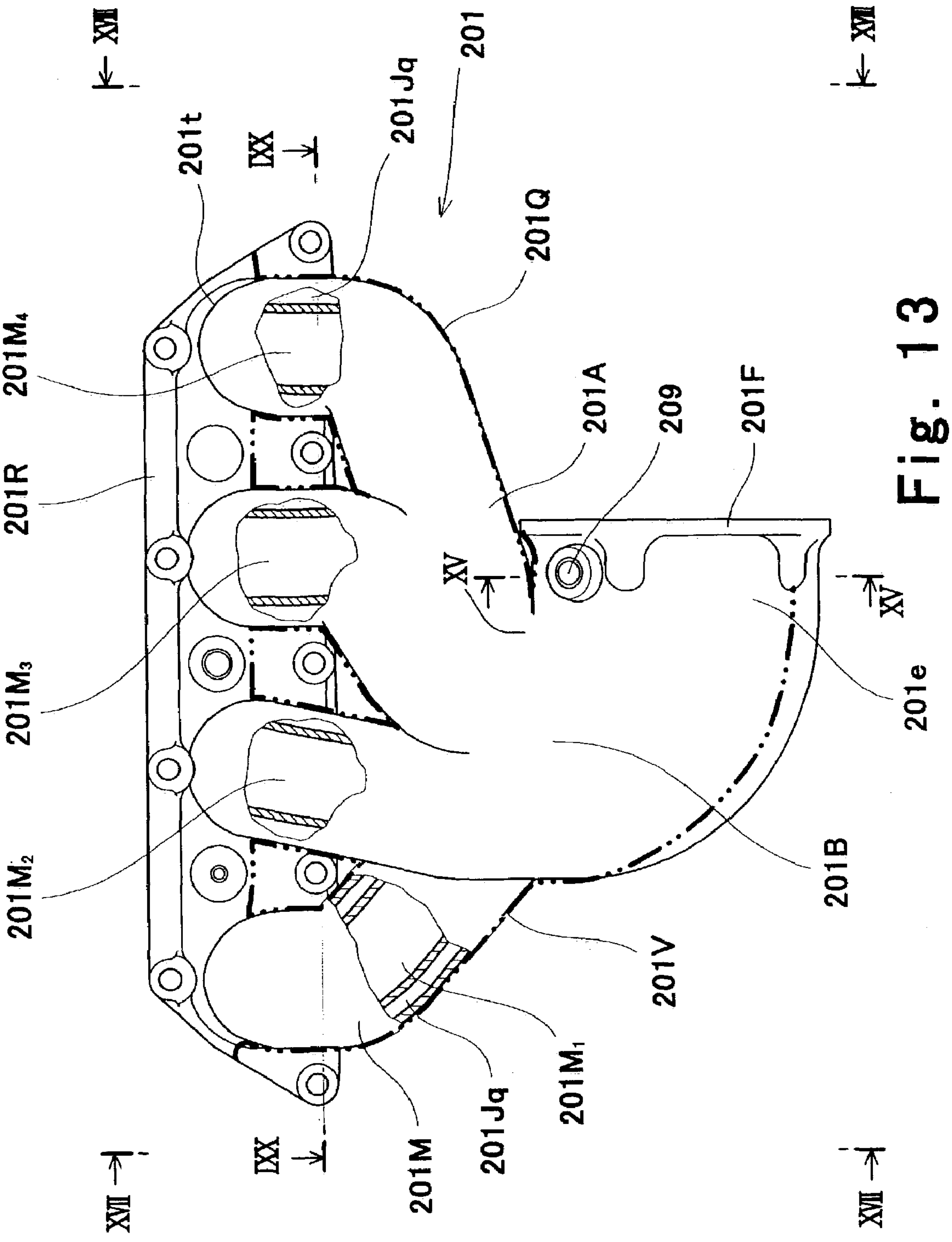
FIG. 13 is a front view showing another configuration of an exhaust pipe collecting structure is a view taken in the direction of arrows along line XIII-XIII in FIG. 14, as seen from the direction perpendicular to the longitudinal direction of a crankshaft of the engine.
Figure 14:
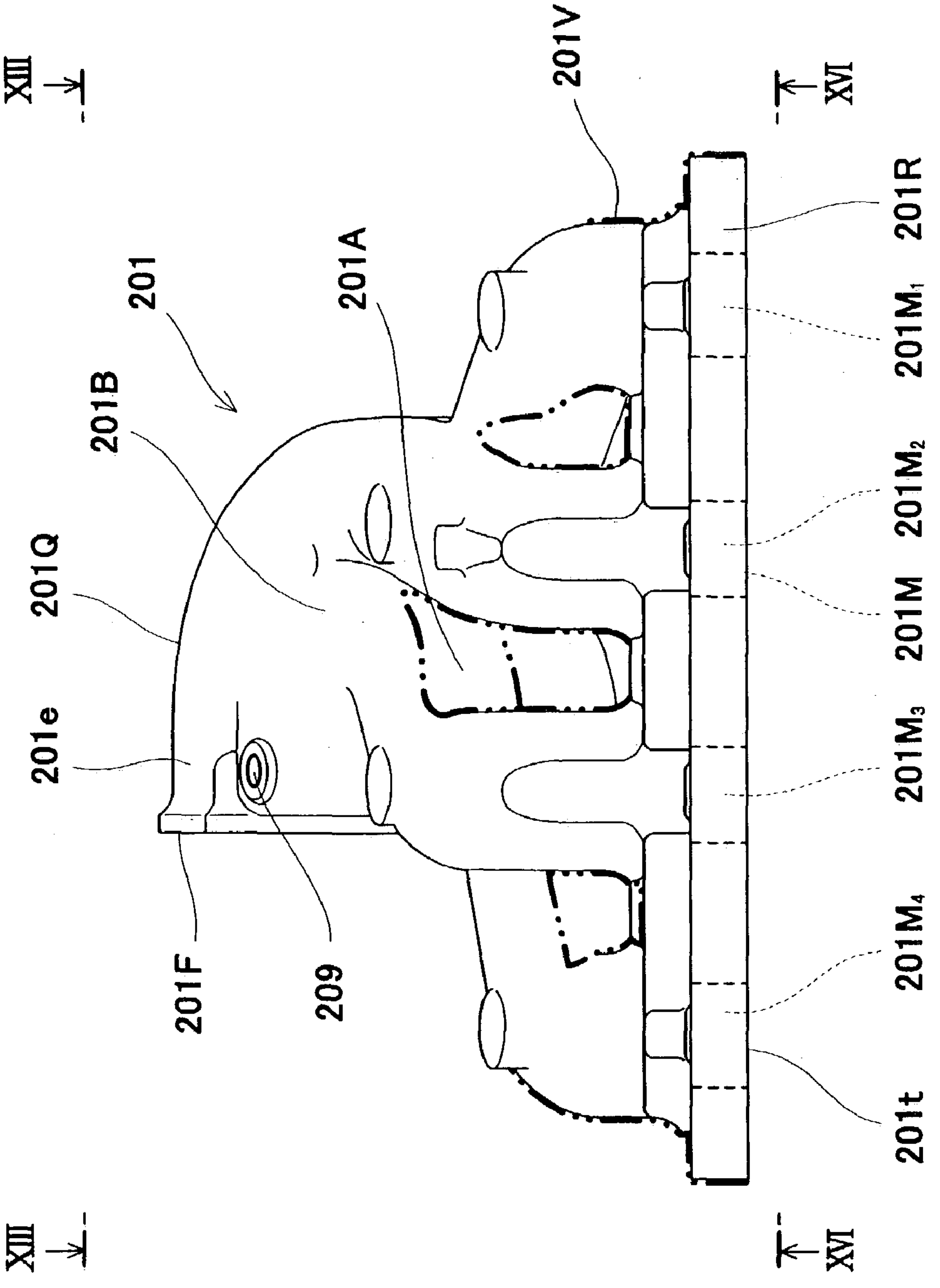
FIG. 14 is a plan view showing a configuration of the exhaust pipe collecting structure in FIG. 13.
Figure 15:
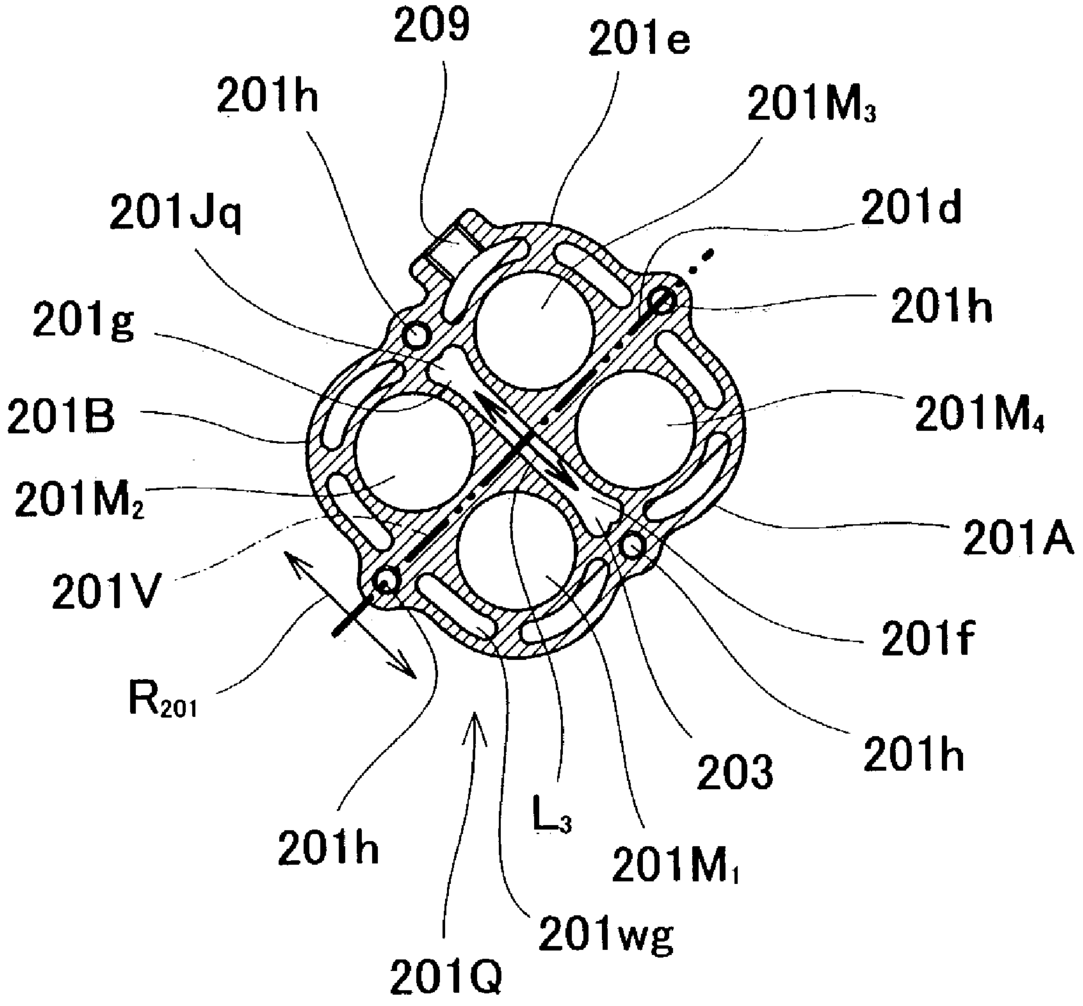
FIG. 15 is a cross-sectional view taken in the direction of arrows along line XV-XV in FIG. 13, showing a structure of a cross-section of a joint portion of the exhaust pipe collecting structure in FIG. 13.

As shown in FIGS. 13 to 15, the exhaust manifold 201Q of the exhaust pipe collecting structure 201 is integrally cast.

The exhaust manifold 201Q comprises exhaust pipes (exhaust passages) 201M (201M1 to 201M4) that are provided for the cylinders, respectively, extending from upstream ends 201*t* connected to the exhaust ports of the cylinders of the engine E to downstream end portions of the joint portion 201*e* which are connected to the upstream end of the connecting tube 201T.

As shown in FIGS. 13 and 14, the exhaust pipe 201M1 of the first cylinder and the exhaust pipe 201M4 of the fourth cylinder are collected at an intermediate position to be apparently formed into a first exhaust sub-collecting pipe 201A. The exhaust pipe 201M2 of the second cylinder and the exhaust pipe 201M3 of the third cylinder are collected at an intermediate position to be apparently formed into a second exhaust sub-collecting pipe 201B. As seen from outside, the exhaust manifold 201Q has four branching upstream end portions and the first exhaust sub-collecting pipe 201A and the second exhaust sub-collecting pipe 201B are collected in the vicinity of their downstream end portions.

The joint portion 201*e* is formed at a position where the first exhaust sub-collecting pipe 201A and the second exhaust sub-collecting pipe 201B are collected as seen from outside.

The exhaust manifold 201Q has an exhaust pipe collecting structure in which the exhaust pipes 201M1 to 201M4 (on the upstream side) forming the exhaust manifold 201Q are collected on the downstream end portion as seen from outside but, in its internal structure, the exhaust pipes 201M1 to 201M4 are independent exhaust passages.

As indicated by an arrow in FIG. 15, a water jacket 20Jq is formed at the joint portions 201*e* to have a water flow cross-section 203 that is elongate in the direction perpendicular to the parting line of the parting plane in casting (plane including a boundary 201*d* between the exhaust sub-collecting pipes 201A and 201B and extending in the depth direction of FIGS. 13 and 14).

As can be seen from FIG. 15, the water flow cross-section 203 of the water Jacket 201Jq is larger in its longitudinal end portions than in its intermediate portion. The water flow cross-section 203 is shaped like a dumbbell. As seen in a cross-sectional view, the flow cross-section 203 is elongate in the direction from a portion 201*f* between the exhaust pipe 201M1 of the first cylinder and the exhaust pipe 201M4 of the fourth cylinder in the first exhaust sub-collecting pipe 201A to a portion 201*g* between the exhaust pipe 201M2 of the second cylinder and the exhaust pipe 201M3 of the third cylinder in the second exhaust sub-collecting pipe 201B.

Because of the absence of a water jacket between the exhaust pipe 201M2 of the second cylinder and the exhaust pipe 201M1 of the first cylinder and between the exhaust pipe 201M3 of the third cylinder and the exhaust pipe 201M4 of the fourth cylinder, it is possible to reduce the dimension of the exhaust manifold 201Q in the direction indicated by an arrow R201 in FIG. 15, in which the exhaust pipe 201M2 of the second cylinder and the exhaust pipe 201M1 of the first cylinder are arranged and the exhaust pipe 201M3 of the third cylinder and the exhaust pipe 201M4 of the fourth cylinder are arranged. This leads to reduction in the dimension of the exhaust manifold 201Q protruding from the side portion of the engine E.

The exhaust manifold 201Q according to this embodiment is provided with a casting parting plane 201V corresponding to a boundary as indicated by bold two-dotted lines in FIGS. 13, 14, 15, 16, 17, and 18. The casting parting plane 201V is a joint plane of a mold vertically divided in two in casting.

Figure 17:
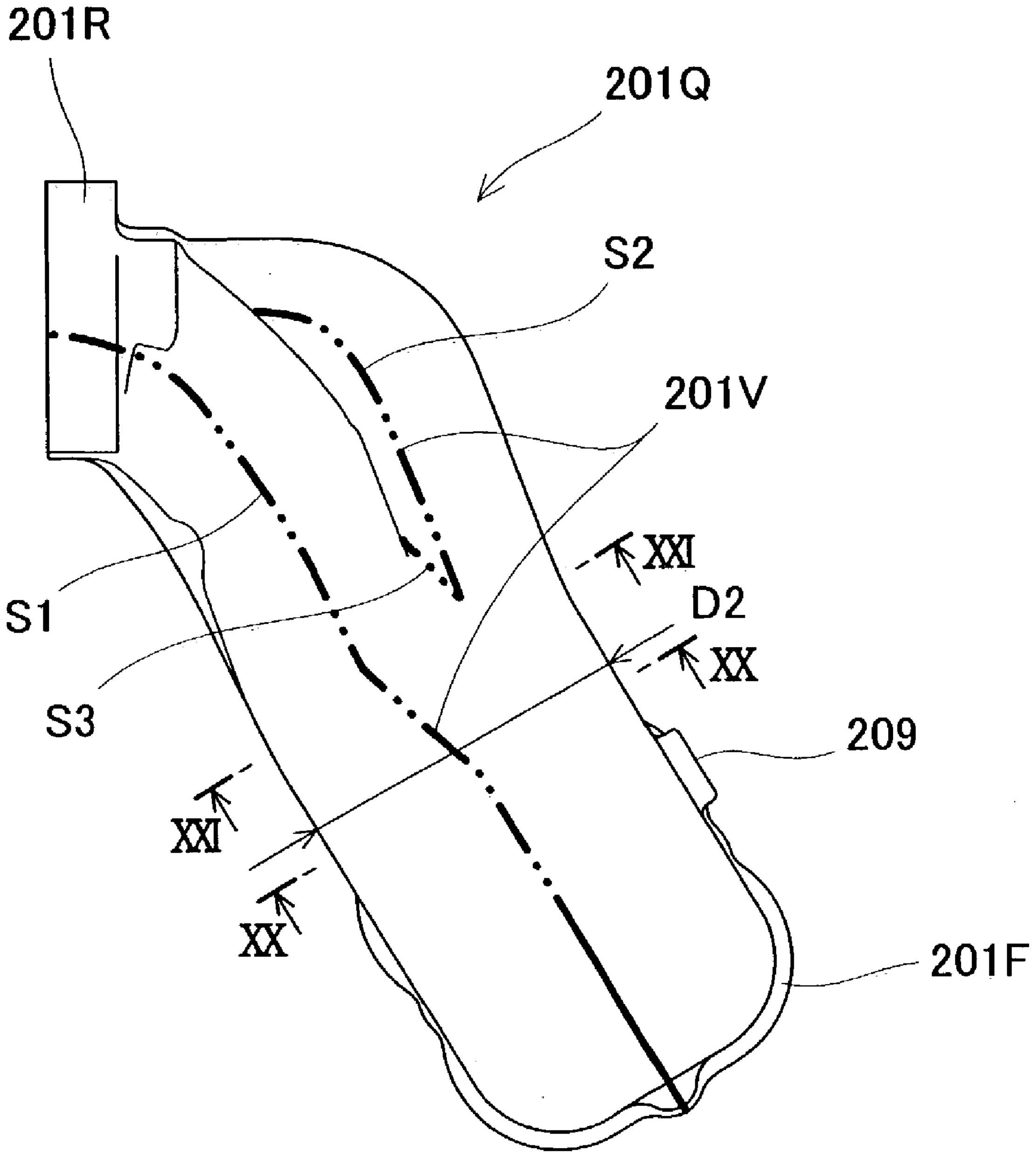
FIG. 17 is a view taken in the direction of arrows along line XVII-XVII in FIG. 13, showing a configuration of the exhaust pipe collecting structure in FIG. 13.
Figure 18:
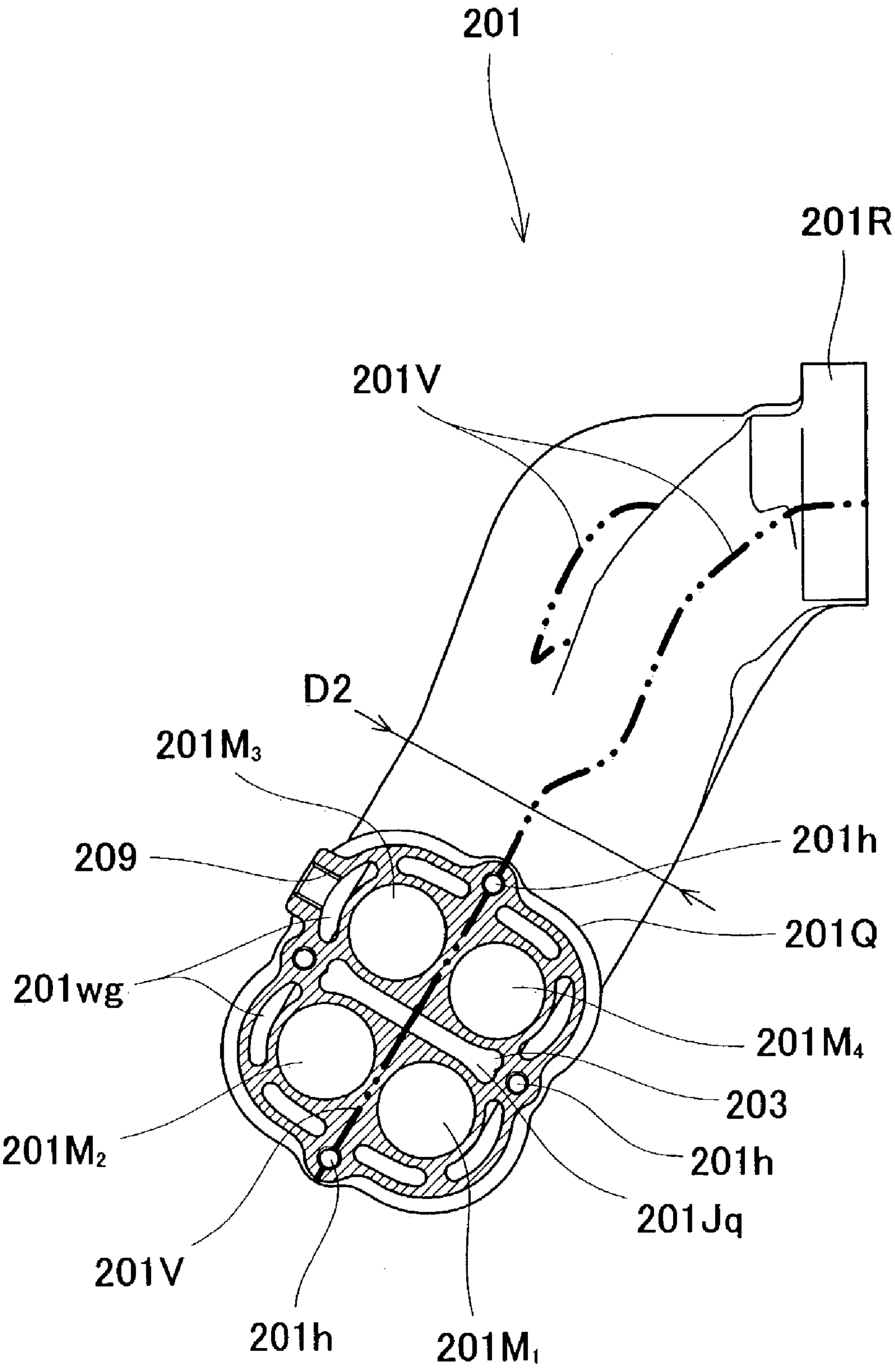
FIG. 18 is a view taken in the direction of arrows along line XVIII-XVIII in FIG. 13, showing a configuration of the exhaust pipe collecting structure in FIG. 13.

The parting plane 201V is located within the same plane at a position where it is located on a line S1 as seen in a side view and is located within another planes continuous with the above plane at a position where it is not located on lines S2 and S3 (see FIGS. 17 and 18). Specifically, as shown in FIG. 17, the parting plane 201V is located on different lines S1, S2, and S3, i.e., at different planes as seen from above in FIGS. 17 and 18, but is located at different positions in the depth direction in FIG. 17 and is continuous along an inclined (or curved) plane in the depth direction in FIG. 17. Also, when the lines S2 and S3 are located at different positions in the depth direction, the parting plane 201V including the lines S2 and S3 is continuous along the inclined (or curved) plane in the depth direction in FIGS. 17 and 18. In this structure, the whole parting plane is continuous in three dimensions.

For the above reasons, the entire exhaust manifold 201Q can be integrally cast.

In accordance with the exhaust manifold (exhaust pipe collecting structure) shown in this embodiment, the parting plane 201V is located on substantially the straight line within a small dimension in the lateral direction (thickness direction of the exhaust manifold 201Q (see the direction indicated by an arrow D2) as shown in FIGS. 17 and 18. This makes the exhaust manifold 201M compact. The exhaust manifold 201Q is thin in the thickness direction thereof (see D2 in FIGS. 17 and 18). In spite of the compact structure, each of the exhaust pipes 201M has a double-walled structure, and around each of the exhaust pipe 201M, the water jacket 201Jq is formed.

Figure 19:
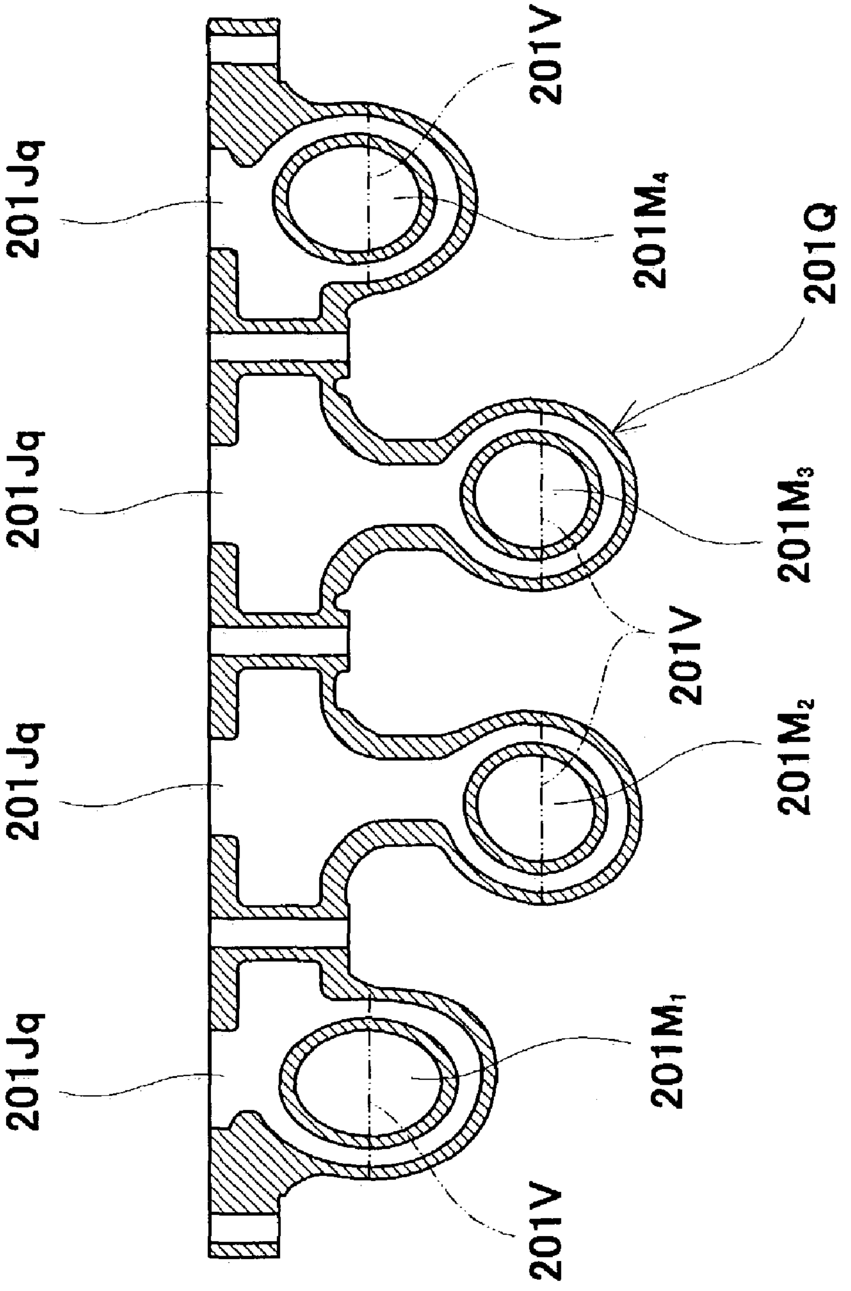
FIG. 19 is a cross-sectional view taken along line IXX-IXX in FIG. 13, showing a configuration of the exhaust pipe collecting structure in FIG. 13.
Figure 20:
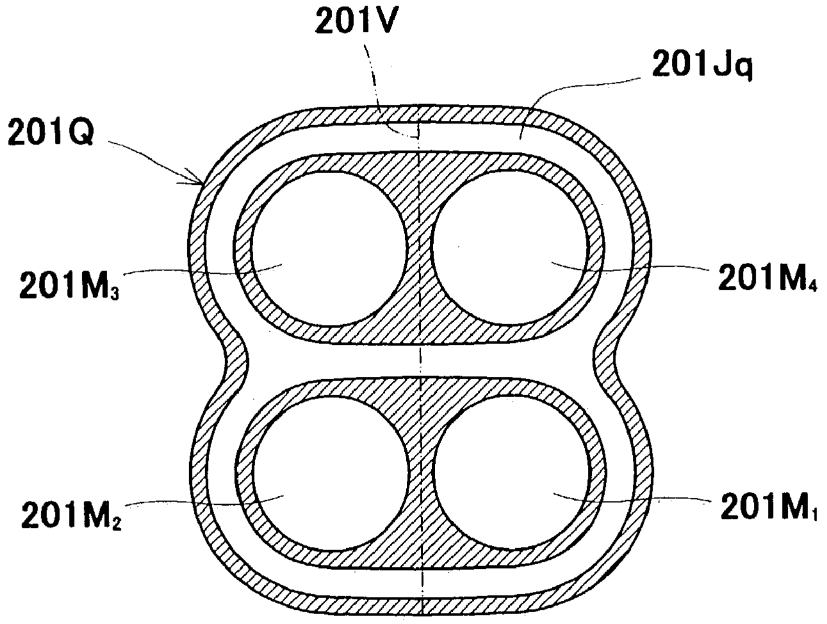
FIG. 20 is a cross-sectional view taken along line XX-XX in FIG. 17, showing a configuration of the exhaust pipe collecting structure in FIG. 17.
Figure 21:
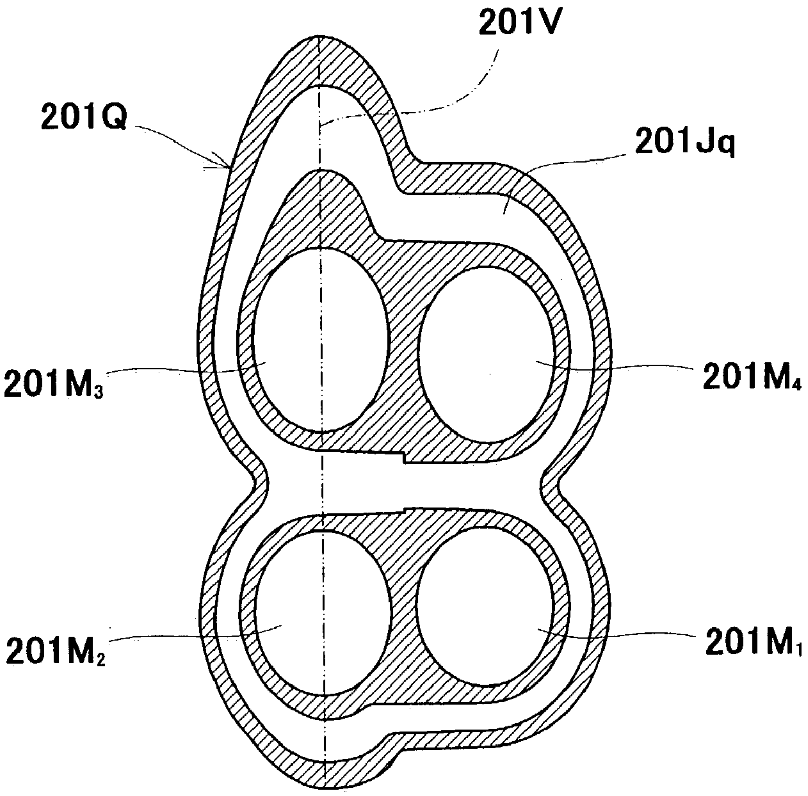
FIG. 21 is a cross-sectional view taken along line XXI-XXI in FIG. 17, showing a configuration of the exhaust pipe collecting structure in FIG. 17.

FIG. 19 shows the cross-section of the exhaust manifold 201Q taken along line IXX-IXX in FIG. 13 and FIG. 20 shows the cross-section of the exhaust manifold 201Q taken along line XX-XX in FIG. 17. Likewise, FIG. 21 shows the cross-section of the exhaust manifold 201Q taken along line XXI-XXI in FIG. 17. In FIGS. 19, 20, and 21, 201M1 denotes the exhaust pipe of the first cylinder, 201M2 denotes the exhaust pipe of the second cylinder, 201M3 denotes the exhaust pipe of the third cylinder, and 201M4 denotes the exhaust pipe of the fourth cylinder. In these Figures, 201Jq denotes water jackets.

Figure 16:
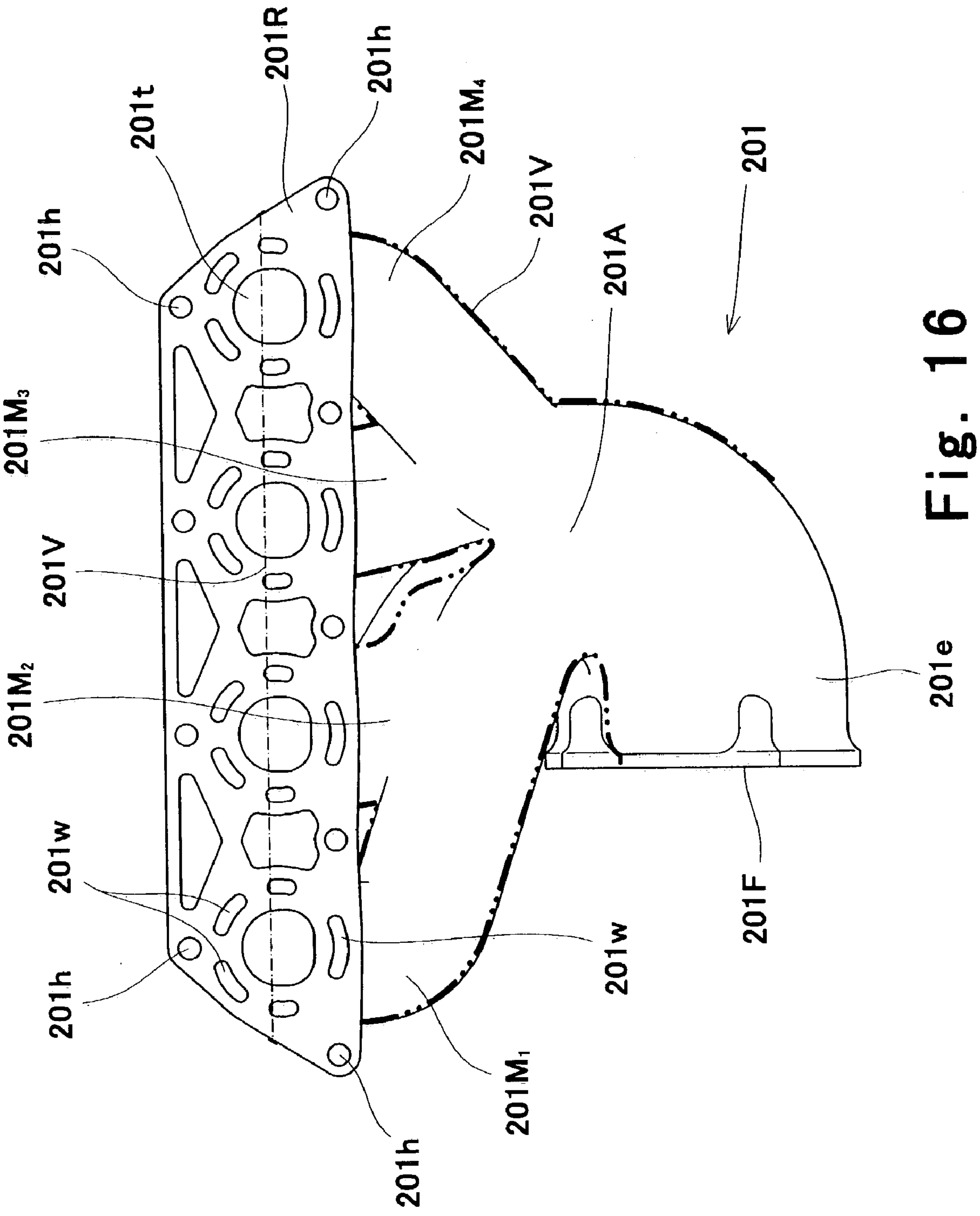
FIG. 16 is a view taken in the direction of arrows along line XVI-XVI in FIG. 14, showing a configuration of the exhaust pipe collecting structure in FIG. 13.

As shown in FIGS. 14 and 16, a flange 201R is provided at the upstream ends 201*t* of the exhaust manifold 201Q to be attached to the engine. As shown in FIG. 16, the flange 201R is provided with mounting holes 201*h* through which the flange 201R is fastened to the engine by means of bolts, and cooling ports 201*w* through which water from the water jacket 201Jq flows toward the water jacket on the engine side, or the water flows in the opposite direction.

Figure 22:
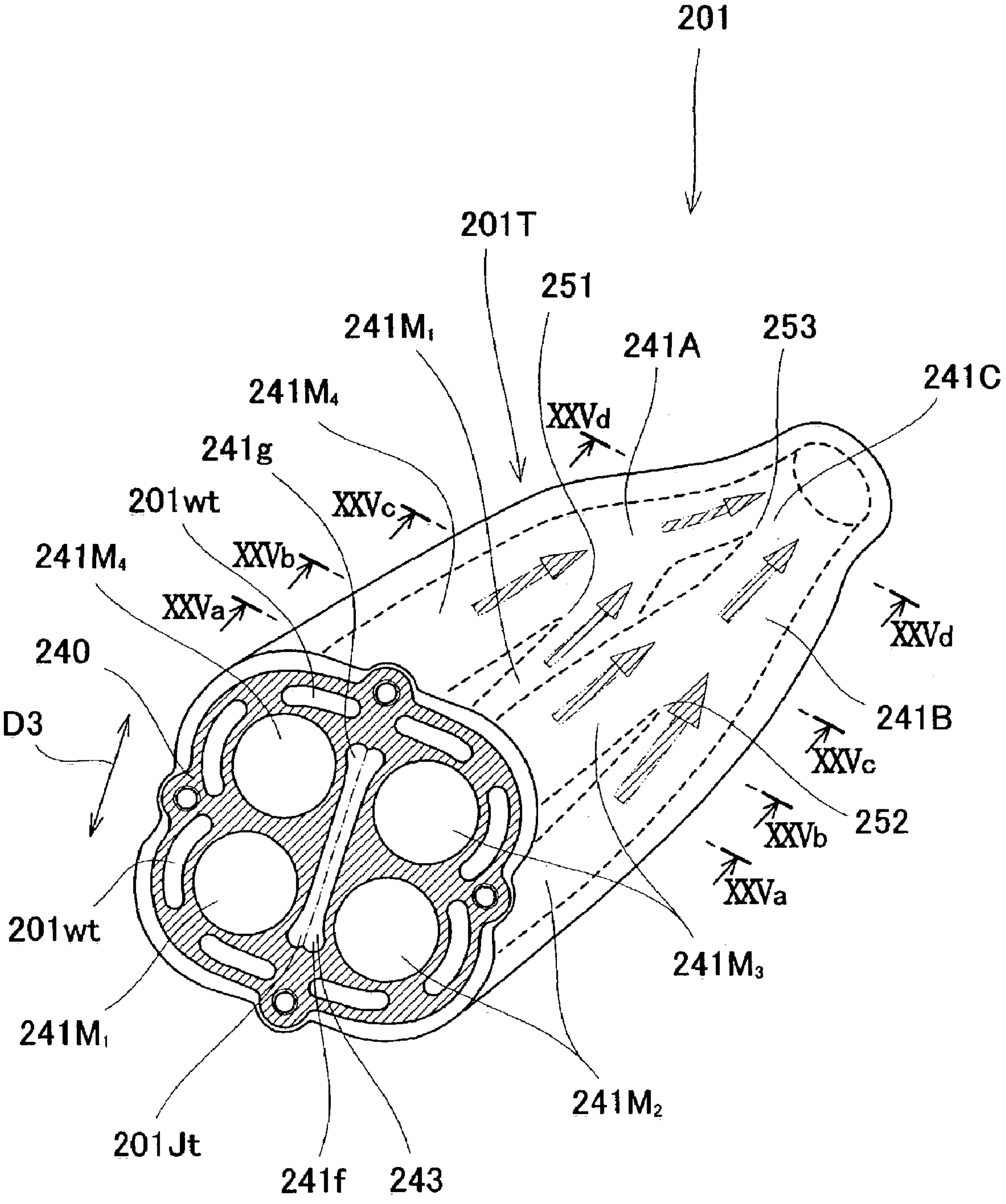
FIG. 22 is a perspective view showing a structure of a connecting tube connected to the joint portion of the exhaust pipe collecting structure in FIG. 18.

As shown in FIG. 16, a flange 201F is provided at a downstream end of the joint portion 201*e* of the exhaust manifold 201Q to be connected to the connecting tube T (see FIG. 22). The flange 201R is also provided with mounting holes 201*h* through which the flange 201R is fastened to the engine by means of bolts and cooling ports 201*w* through which water from the water jacket 201Jq flows toward the water jacket 201Jt of the connecting tube 201T (see FIG. 22) located on the downstream side, or the water flows in the opposite direction (see FIG. 22). The cooling ports 201*w* correspond to an end face of the water jacket 201Jq.

In FIG. 18, 209 denotes a cooling water supply port through which cooling water is supplied to cooling ports 201*wg* and the water jacket 201Jq of the exhaust manifold 201Q.

In the exhaust pipe collecting structure 201, the flange (joint portion) 201F of the exhaust manifold 201Q is connected to a connecting tube 201T in FIG. 22.

A connecting end face 240 of the connecting tube 201T, which is connected to the flange 201F (see FIG. 16) is structured as follows. At the connecting end face 240 of the connecting tube 201T, the water jacket 201Jt is located at a center thereof to extend obliquely rightwardly in FIG. 22 and serves to cool an inside of the connecting tube 201T. The water jacket 201Jt of the connecting tube 201T is connected to the water jacket 201Jq of the exhaust manifold 201Q shown in FIG. 15 or 18 such that the longitudinal axes of water flow cross-sections 203 and 243 of the water jackets 201Jq and 201Jt cross each other. Typically, the longitudinal axes of water flow cross-sections 203 and 243 make an angle of 90 degrees.

Furthermore, as shown in FIG. 22, in the connecting end face 240, an end face of a first connecting exhaust passage 241M1 connected to the exhaust pipe 201M1, an end face of a fourth connecting exhaust passage 241M4 connected to the exhaust pipe 201M4, an end face of a second connecting exhaust passage 241M2 connected to the exhaust pipe 201M2, and an end face of the third connecting exhaust passage 241M3 connected to the exhaust pipe 201M3 are opened.

At the connecting end face 240 in FIG. 22, the water flow cross-section 243 of the water jacket 201Jt is elongate in the direction from a portion 241*f* between the first connecting exhaust passage 241M1 and the second connecting exhaust passage 241M2 to a portion 241*g* between the fourth connecting exhaust passage 241M4 and the third connecting exhaust passage 241M3. The water flow cross-section 243 is like a dumbbell.

As indicated by a broken line in FIG. 22, the first connecting exhaust passage 241M1 and the fourth connecting exhaust passage 241M4 are collected at a merging point 251 located upstream of a downstream end portion (right upper end in FIG. 22) of the connecting tube 201T into a first collecting exhaust passage (exhaust sub-collecting pipe) 241A, and the second connecting exhaust passage 241M2 and the third connecting exhaust passage 241M3 are collected at a merging point 252 located upstream of the end portion into a second collecting exhaust passage (exhaust sub-collecting pipe) 241B.

Finally, the first collecting exhaust passage 241A and the second collecting exhaust passage 241B are collected at a merging point 253 in the vicinity of the end portions into a single exhaust passage 241C. The merging point 253 is positioned downstream of the merging points 251 and 252.

Another water jackets 201Wt provided at eight positions in a peripheral portion of the connecting tube 201T are connected to the cooling ports wg provided in a peripheral portion on the exhaust manifold 201Q in FIG. 15 to allow cooling water to flow therethrough.

Figure 25A:
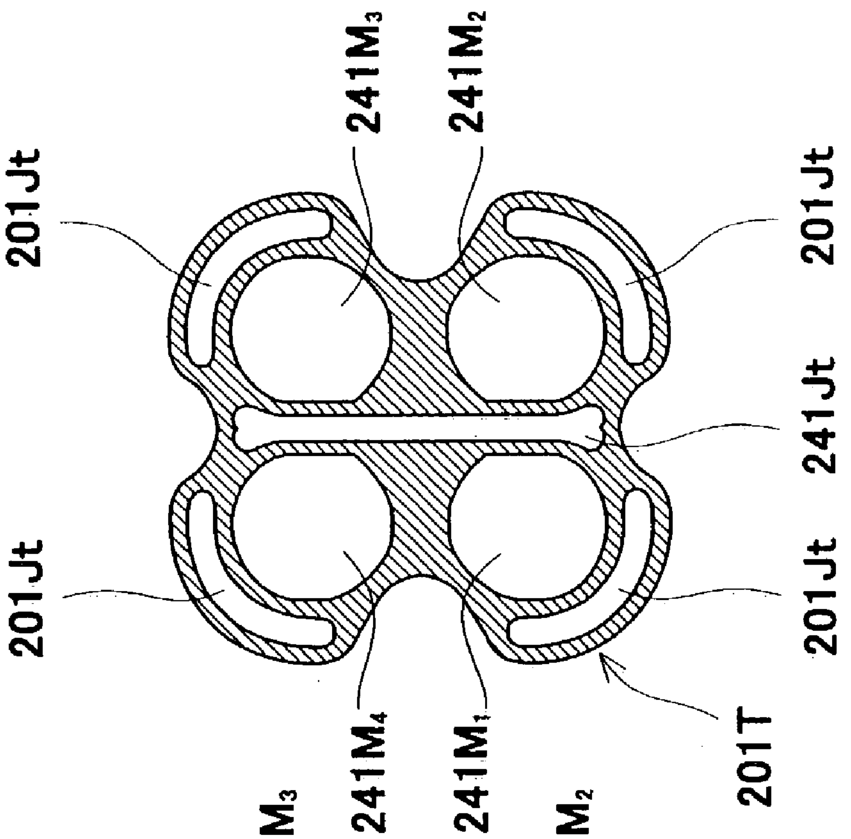
FIG. 25A is a cross-sectional view taken along line XXVa-XXVa, showing the structure of the connecting tube in FIG. 22.
Figure 25B:
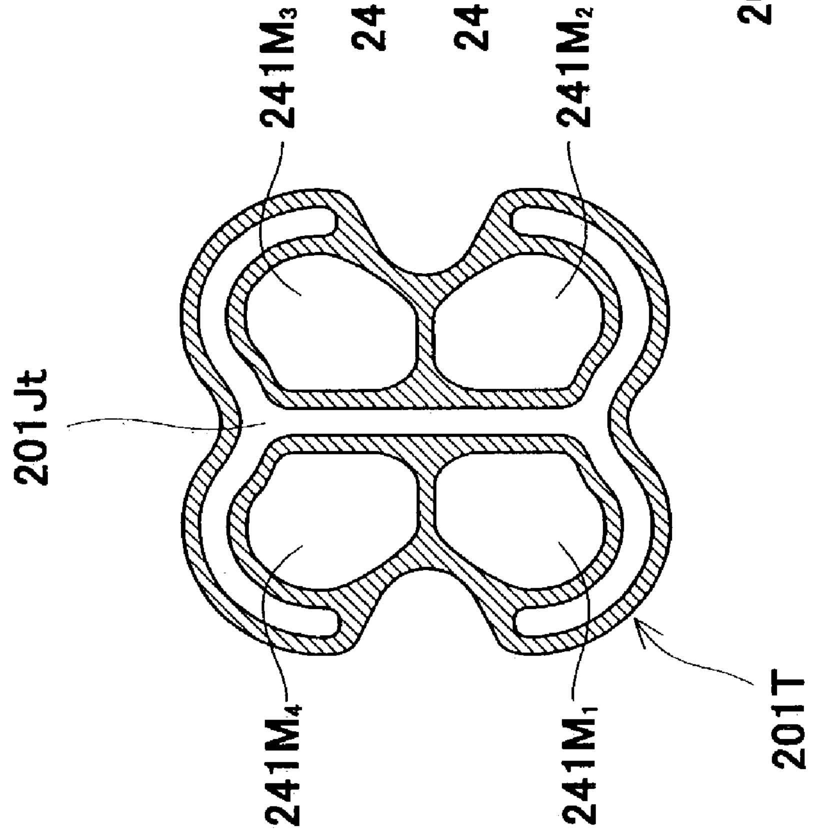
FIG. 25B is a cross-sectional view taken along line XXVb-XXXb in FIG. 22, showing the structure of the connecting tube in FIG. 22.
Figure 25C:
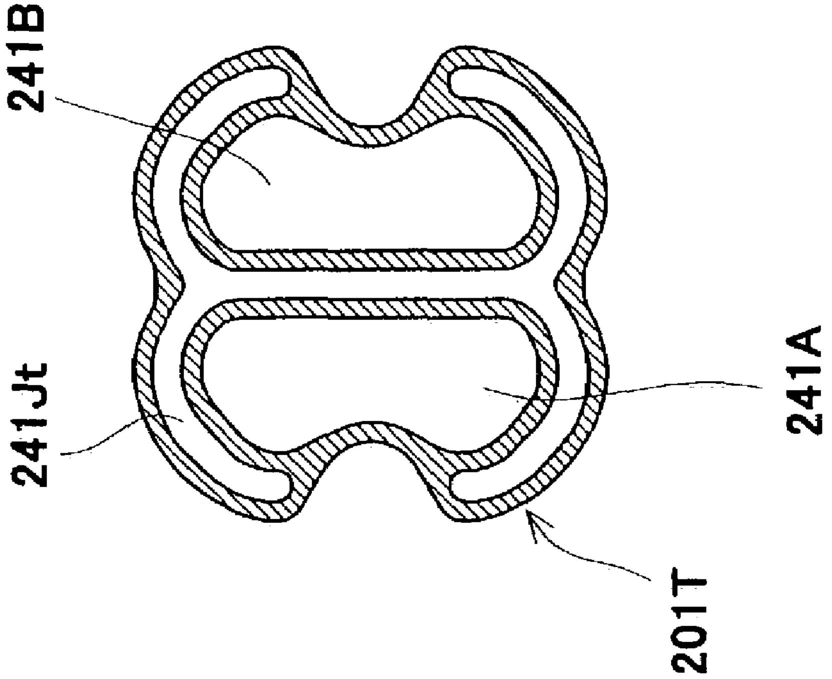
FIG. 25C is a cross-sectional view taken along line XXVc-XXVc in FIG. 22, showing the structure of the connecting tube in FIG. 22.
Figure 25D:
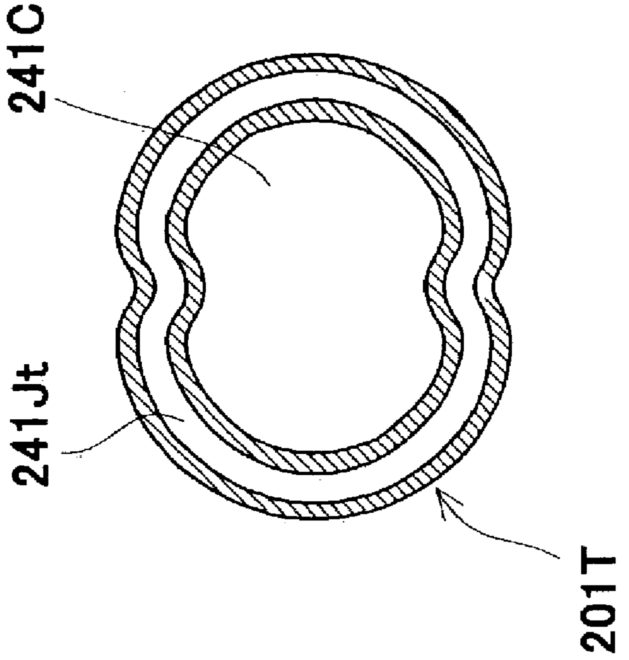
FIG. 25D is a cross-sectional view taken along line XXVd-XXVd in FIG. 22, showing the structure of the joint portion in FIG. 22.

The variation in the cross-sectional shape of the exhaust passages and water jacket 201Jq of the connecting tube 201T which are sectioned in the direction perpendicular to a flow of the exhaust gases is as follows. The cross-section taken along line XXVa-XXVa in FIG. 22 is shown in FIG. 25A, the cross-section taken along line XXVb-XXVb in FIG. 22 is shown in FIG. 25B, the cross-section taken along line XXVc-XXVc in FIG. 22 is shown in FIG. 25C, and the cross-section taken along line XXVd-XXVd in FIG. 22 is shown in FIG. 25D.

In the connecting tube 201T having the above structure, because of the absence of the water jackets 201Jt between the first connecting exhaust passage 241M1 and the fourth connecting exhaust passage 241M4 and between the second connecting exhaust passage 241M2 and the third connecting exhaust passage 241M3, the water jacket 201Jt having the water flow cross-section 243 is extended to the downstream portion of the connecting tube 201T. More specifically, the water jacket 201Jt extends to pass through the merging point 251 where the first connecting exhaust passage 241M1 and the fourth connecting exhaust passage 241M4 are merged and the merging point 252 where the second connecting exhaust passage 241M2 and the third connecting exhaust passage 241M3 are merged, and to its downstream region located upstream of the merging point 253 where the first collecting exhaust passage 241A and the second collecting exhaust passage 241B are merged. As a result, cooling capability of the connecting tube 201T is improved.

As shown in FIG. 22, it is also possible to reduce the dimension of the connecting tube 201T in the direction indicated by an arrow D3 in FIG. 22 in which the first connecting exhaust passage 241M1 and the fourth connecting exhaust passage 241M4 (the second connecting exhaust passage 241M2 and the third connecting exhaust passage 241M3) are arranged. This reduces the dimension of the connecting tube 201T protruded from the side portion of the engine E is reduced with the exhaust manifold 201Q and the connecting tube 201T mounted on the engine.

In the structure in which the longitudinal axis of the water jacket jq of the exhaust manifold 201Q (see FIG. 18) crosses the longitudinal axis of the water jacket jt of the connecting tube 201T, as shown in FIGS. 23A and 23B, a water flow cross-sectional portion 248 that is enlarged in substantially circular shape is located at center positions of the water flow cross-sections to increase a water flow cross-sectional area. So, at the connecting portion between the water jackets jq and jt with their longitudinal axes crossing each other, a sufficient water flow-cross sectional area is obtained. In this structure, at the connecting portion, the cooling water smoothly flows.

Figure 24A:
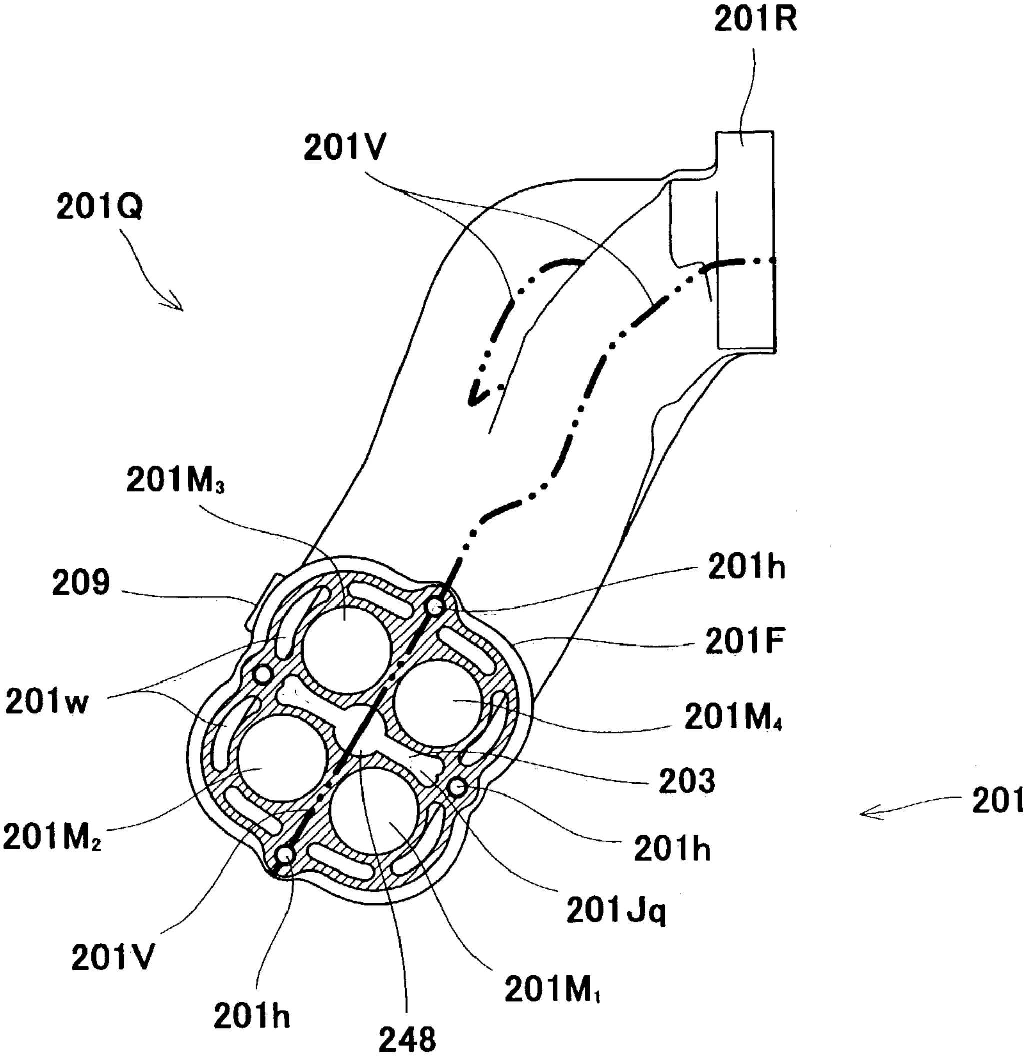
FIG. 24A is a perspective view showing another configuration of the joint portion of the exhaust pipe collecting structure.
Figure 24B:
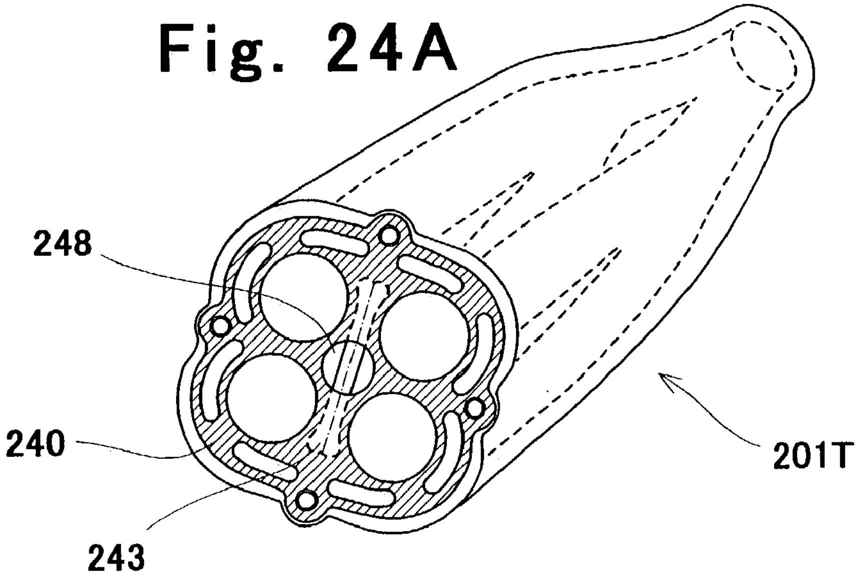
FIG. 24B is a perspective view showing a structure of a connecting tube connected to the joint portion of the exhaust pipe collecting structure in FIG. 24A.

Instead of the substantially circular shape, other shapes including an oval shape, a rectangular shape, etc may be used as the shape to increase the water flow cross-sectional area. Alternatively, as shown in FIG. 24B, a circular water flow portion 248 may be exposed in the connecting end face 240 of the connecting tube 201T, and inside the connecting tube 201T, the downstream portion of the circular water flow portion 248 may be connected to the dumbbell-shaped water flow portion 248 of the water jacket 201Jq of the exhaust manifold 201Q. In this structure, an end face portion of the water jacket 201Jq of the exhaust manifold 201Q is closed by the connecting end face 240 of the connecting tube 201T except the circular water flow portion. Alternatively, at the position where the water jacket 201Jq of the exhaust manifold 201Q is connected to the water jacket 201Jt of the connecting tube 201T, the water flow portion 248 of the water jacket 201Jq may be circular to conform in shape to that of the connecting tube 201T. Further, alternatively, in the configuration shown in FIGS. 23A and 23B, a packing member (seal member) is provided in the connecting face to have the circular hole to allow the cooling water to flow from the exhaust manifold 201Q to the connecting tube 201T therethrough.

While the exhaust manifold and the connecting tube are independent of each other, they may be integral with each other. In this structure, the water jacket having the above structure is formed inside the exhaust pipe collecting structure in which the exhaust manifold and the connecting tube are integral with each other.

The above-described embodiments may be applied to an exhaust pipe collecting structure of a two-cycle engine, in addition to the four-cycle engine, in which case the same function and effects are provided. Further, the embodiments may be applied to four cylinders of six cylinders, four cylinders of eight cylinders, four cylinders of ten cylinders, four cylinders of twelve cylinders, etc, and the same function and effects are provided.

The exhaust pipe collecting structure of the present invention may be used in exhaust pipe collecting structures of engine units of vehicles other than the personal watercraft; for example, a small all-terrain vehicle.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. An exhaust pipe collecting structure for a multi-cylinder engine unit having multiple cylinders, in which exhaust pipes extend from at least four cylinders of the multiple cylinders and are collected into one exhaust passage at a location downstream in a flow of exhaust gases, the structure comprising:

an exhaust manifold formed in one unitary, integrally cast piece and having an upstream end portion which is connected to the cylinders and including a plurality of exhaust passages corresponding to exhaust ports of the cylinders, respectively;

a connecting tube formed in one unitary, integrally cast piece and connected to a downstream end of the exhaust manifold, the connecting tube including a plurality of connecting exhaust passages communicating with the plurality of exhaust passages of the exhaust manifold and being merged into the one exhaust passage at a location inside the connecting tube, the connecting tube being separably connected to the exhaust manifold by a fastening device;

wherein at least a downstream end portion of the exhaust manifold includes the exhaust passages which are arranged in two lines and forms an integral tube; and wherein a casting parting plane in casting of the exhaust manifold is provided between the two lines of the exhaust passages.

2. The exhaust pipe collecting structure according to claim 1, wherein the multiple cylinders are four cylinders.

3. The exhaust pipe collecting structure according to claim 2, wherein the exhaust manifold is integrally cast by locating the casting parting plane of the exhaust manifold within one continuous plane.

4. An exhaust pipe collecting structure for a multi-cylinder engine unit having multiple cylinders, in which exhaust pipes extend from at least four cylinders of the multiple cylinders and are collected into one exhaust passage at a location downstream in a flow of exhaust gases, the structure comprising:

a first exhaust pipe group and a second exhaust pipe group each of which is comprised of two exhaust pipes selected from four exhaust pipes respectively connected to the four cylinders at upstream end portions thereof;

a first exhaust sub-collecting pipe configured to collect the first exhaust pipe group to form one exhaust passage;

a second exhaust sub-collecting pipe configured to collect the second exhaust pipe group to form another exhaust passage;

a first joint portion formed at a downstream end portion of the first exhaust sub-collecting pipe, the first joint portion including a first semi-cylindrical peripheral wall having a joint face defining the opening and extending along a direction of the flow of the exhaust gases; and a second joint portion formed at a downstream end portion of the second exhaust sub-collecting pipe, the second joint portion including a second semi-cylindrical peripheral wall having an opening with a joint face defining the opening and extending along a direction of flow of the exhaust gases; and a fastener device;

wherein the first exhaust sub-collecting pipe includes the first exhaust pipe group and the first joint portion and is formed in one unitary, integrally cast piece, and the second exhaust sub-collecting pipe includes the second exhaust pipe group and the second joint portion and is formed in one unitary, integrally cast piece, each of the unitary, integrally cast pieces being separable from the other;

and wherein the opening of the first joint portion is opened toward the second joint portion and the opening of the second joint portion is opened toward the first joint portion, the first joint portion and the second joint portion are separably joined to each other at the joint faces thereof by the fastening device to form the one exhaust passage including the first semi-cylindrical peripheral wall and the second semi-cylindrical peripheral wall.

5. The exhaust pipe collecting structure according to claim 4, further comprising a rubber tube that covers an outer periphery of the first and second semicylindrical peripheral walls that are joined to face each other.

6. An exhaust pipe collecting structure for a multi-cylinder engine unit having multiple cylinders, in which exhaust pipes extend from at least four cylinders of the multiple cylinders and are collected into one exhaust passage at a location downstream of the exhaust pipes in a flow of exhaust gases, the structure comprising:

a first exhaust pipe group and a second exhaust pipe group each of which is comprised of two exhaust pipes selected from four exhaust pipes respectively connected to the four cylinders at upstream end portions thereof;

a first exhaust sub-collecting pipe configured to collect two exhaust pipes of the first exhaust pipe group to form one exhaust passage;

a second exhaust sub-collecting pipe configured to collect two exhaust pipes of the second exhaust pipe group to form another exhaust passage;

a first joint portion formed at a downstream end portion of the first exhaust sub-collecting pipe;

a second joint portion formed at a downstream end portion of the second exhaust sub-collecting pipe, the second joint portion being arranged in parallel with the first joint portion so that an exhaust gas in the first joint portion and an exhaust gas in the second joint portion flow in parallel; and wherein the first exhaust sub-collecting pipe includes the first exhaust pipe group and the first joint portion, and is formed in one unitary, integrally cast piece, and the second exhaust sub-collecting pipe includes the second exhaust pipe group and the second joint portion, and is formed in one unitary, integrally cast piece, the unitary, integrally cast pieces being separable from each other;

the exhaust pipe collecting structure further comprising:

a connecting tube located downstream of the first and second joint portions, for allowing the exhaust gases flowing through the exhaust passages inside the first and second joint portion to be led into a common exhaust passage, the connecting tube being separable from the unitary, integrally cast piece of the first exhaust sub-collecting pipe and the unitary, integrally cast piece of the second exhaust sub-collecting pipe;

wherein the connecting tube includes two parts having a joint surface at which the two parts are jointed to each other, the joint surface extending along a flow of the exhaust gas in the connecting tub, the first joint portion and the second joint portion are connected to each other by a fastening device, and the joint surfaces of the two parts are joined by a fastening device, to join the first joint portion, the second joint portion, and the connecting tube.

7. The exhaust pipe collecting structure according to claim 6, wherein the first and second exhaust sub-collecting pipes and the connecting tube have double-walled structures to have cooling passages between walls.

8. An exhaust pipe collecting structure for a multi-cylinder engine unit having multiple cylinders, in which exhaust pipes extend from cylinders of the multiple cylinders and are collected into one exhaust passage at a location downstream of the exhaust pipes in a flow of exhaust gases, the structure comprising:

a connecting tube; and an exhaust manifold attached on the connecting tube, the exhaust manifold including:

a first exhaust sub-collecting pipe and a second exhaust sub-collecting pipe located on downstream portions of exhaust pipes extending from the cylinders, the first and second exhaust sub-collecting pipes being configured to have internal independent exhaust passages of the exhaust gases flowing from the exhaust pipes, the first and second exhaust sub-collecting pipes being integral with each other at least at their joint portions as seen from outside;

a first water jacket formed at the joint portions to have a water flow cross-section elongate in a direction perpendicular to a casting parting plane forming a boundary of the first and second exhaust sub-collecting pipes as seen in a cross-sectional view, wherein the multiple cylinders are four cylinders, the first exhaust sub-collecting pipe is configured to have internal independent exhaust passages of the exhaust pipes of two cylinders selected from the four cylinders, the second exhaust sub-collecting pipe is configured to have internal independent exhaust passages of the exhaust pipes of the remaining two cylinders, the first water jacket is formed at the joint portions where the first and second exhaust sub-collecting pipes are integral with each other, to have the water flow cross-section that is elongate in a direction from a region between the two exhaust pipes of the first exhaust sub-collecting pipe to a region between the two exhaust pipes of the second exhaust sub-collecting pipe so as to cross the casting parting plane forming the boundary of the first and second exhaust sub-collecting pipes as seen in a cross-sectional view, wherein the connecting tube further comprises:

a plurality of connecting exhaust passages communicating with the exhaust pipes of the exhaust manifold and being merged into a single exhaust passage; and a second water jacket extending to a position upstream of the single exhaust passage so as to substantially define two groups of the connecting exhaust passages.

9. The exhaust pipe collecting structure according to claim 8, wherein the second water jacket of the connecting tube is configured to cross the first water jacket of the exhaust manifold at center portions in cross-sections of the exhaust manifold and the connecting tube.

10. The exhaust pipe collecting structure according to claim 9, wherein the second water jacket and the first water jacket respectively have increased water flow sections at the center portion.

* * * * *